United States Patent
Yokota et al.

(10) Patent No.: US 7,203,579 B2
(45) Date of Patent: Apr. 10, 2007

(54) METHOD AND APPARATUS FOR ESTIMATING ROAD SURFACE STATE AND TIRE RUNNING STATE, ABS AND VEHICLE CONTROL USING THE SAME

(75) Inventors: Hidetoshi Yokota, Tokyo (JP); Hiroshi Morinaga, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 0 days.

(21) Appl. No.: 10/499,431

(22) PCT Filed: Dec. 20, 2002

(86) PCT No.: PCT/JP02/13332

§ 371 (c)(1),
(2), (4) Date: Jun. 21, 2004

(87) PCT Pub. No.: WO03/053747

PCT Pub. Date: Jul. 3, 2003

(65) Prior Publication Data

US 2005/0085987 A1   Apr. 21, 2005

(30) Foreign Application Priority Data

Dec. 21, 2001 (JP) .............................. 2001-390560
Dec. 21, 2001 (JP) .............................. 2001-390583
Dec. 21, 2001 (JP) .............................. 2001-390605

(51) Int. Cl.
*B60C 23/04* (2006.01)
*B60T 8/171* (2006.01)
*B60T 8/1763* (2006.01)

(52) U.S. Cl. .................... 701/29; 701/80; 303/150; 303/194

(58) Field of Classification Search .................... None
See application file for complete search history.

(56) References Cited

U.S. PATENT DOCUMENTS 4,574,267 A * 3/1986 Jones .......................... 340/443
4,770,438 A * 9/1988 Sugasawa et al. ........ 280/5.518

(Continued)

FOREIGN PATENT DOCUMENTS

EP   0312096 A   10/1989
EP   1219515 A   7/2002

(Continued)

Primary Examiner—Michael J. Zanelli
(74) Attorney, Agent, or Firm—Sughrue Mion, PLLC

(57) ABSTRACT

The frequency of an information signal indicative of a-vibration of a wheel detected by an acceleration sensor mounted to a wheel; or a change in the pressure of a gas in a tire detected by a pressure sensor installed in the tire, is analyzed. The band value of the obtained vibration spectrum or pressure change spectrum is detected, and a vibration level or pressure change level at the detected frequency band is compared with: a vibration level table showing the relationship between road friction coefficient $\mu$ and vibration level; or a pressure change level table showing the relationship between road friction coefficient $\mu$ and pressure change level, to estimate a road friction coefficient $\mu$. Therefore, it is possible to estimate the value of road friction coefficient $\mu$ accurately and improve the safety of a car.

91 Claims, 21 Drawing Sheets

U.S. PATENT DOCUMENTS

| | | | |
|---|---|---|---|
| 5,065,618 A * | 11/1991 | Hodges et al. | 73/146 |
| 5,325,300 A | 6/1994 | Tsuyama et al. | |
| 5,852,243 A * | 12/1998 | Chang et al. | 73/659 |
| 6,264,292 B1 * | 7/2001 | Umeno et al. | 303/196 |
| 2002/0162389 A1 * | 11/2002 | Yokota et al. | 73/146 |

FOREIGN PATENT DOCUMENTS

| | | | |
|---|---|---|---|
| JP | 5-99014 A | | 4/1993 |
| JP | 6-213801 A | | 8/1994 |
| JP | 06-258196 | * | 9/1994 |
| JP | 9-170916 A | | 6/1997 |
| JP | 9-196791 A | | 7/1997 |
| JP | 2002-240520 A | | 8/2002 |
| WO | WO 89/03780 A | | 5/1989 |
| WO | WO 98/56606 A | | 12/1998 |

* cited by examiner

METHOD AND APPARATUS FOR ESTIMATING ROAD SURFACE STATE AND TIRE RUNNING STATE, ABS AND VEHICLE CONTROL USING THE SAME

BACKGROUND OF THE INVENTION

1. Field of the Invention

The present invention relates to a method and apparatus for estimating the running state of a tire and the condition of a road in contact with the tire at the time of running.

2. Description of the Prior Art

To enhance the running stability of a car, it is desired that the state of a tire and the condition of a road in contact with the tire at the time of running should be estimated accurately and fed back to car control. The expression "state of a tire" means the prediction of the inside pressure, wear or trouble of a tire and the expression "the condition of a road" means mainly a friction coefficient between a road and a tire (road friction coefficient $\mu$).

If the running state of a tire and the condition of a road can be estimated, before a trouble occurs in the tire, a car can be stopped for inspection, or before the operation of avoiding a danger such as braking or steering is made, advanced control with an ABS brake can be carried out. Thereby, the further improvement of safety is expected. Simply by informing a driver of the degree of danger of the condition of a road during driving, the driver can decelerate the car earlier. Thereby, a reduction in the number of car accidents can be expected.

In the prior art, to estimate a road friction coefficient, there are proposed a method in which a road friction coefficient is estimated making use of a phenomenon that the uniformity level of a tire which is a physical amount indicative of a change in the revolution of a wheel is changed by the size of a road friction coefficient (JP-A 2000-55790) and a method in which an accelerometer is mounted to a lower arm for interconnecting the front wheel and the car body to detect the horizontal vibration of a tire which is toed in and a road friction coefficient is estimated making use of a phenomenon that the above vibration level is changed by a road friction coefficient (JP-A 6-258196) (the term "JP-A" as used herein means an "unexamined published Japanese patent application").

However, in the above method for estimating the road friction coefficient from the uniformity level of a tire, a flat spot is formed on the tire to deteriorate the uniformity and accurate estimation is difficult in the recovery process of the uniformity.

In the method for estimating the road friction coefficient from the horizontal vibration of a front wheel which is toed in, when the slip angle of the tire becomes nil or large, the measurement accuracy is low.

There is also proposed a method of estimating a road friction coefficient from transmission characteristics between a nonsuspended acceleration which is an acceleration in the vertical direction of a wheel and a suspended acceleration which is an acceleration in the vertical direction of a car body (JP-A 11-94661). Since steering force is not used to estimate the road friction coefficient in this method, the road friction coefficient can be estimated even for a straight road where almost no steering is made. However, since the road friction coefficient is estimated from the transmission characteristics of a vibration between two points through a suspension having large buffer characteristics such as a spring or damper, it is easily affected by the unevenness of the road. For example, since a nonsuspended vibration becomes large on a rough road such as a snow road, the difference in level between a suspended vibration which is absorbed by a suspension and the above nonsuspended vibration becomes large, thereby making it impossible to estimate the road friction coefficient accurately.

It is an object of the present invention which has been made in view of the problem of the prior art to improve the running stability of a car by estimating the condition of a road in contact with tires and the running state of a tire accurately.

SUMMARY OF THE INVENTION

The inventors of the present invention have studied in detail the behavior of a tire in contact with a road at the time of running and the behavior of a tire at the time of a trouble and have found that the level of a vibration at one or a plurality of frequency bands of a frequency spectrum (vibration spectrum) obtained by analyzing the frequency of a vibration in the circumferential direction of the tire or a vibration in the transverse direction of the tire at the time of running changes characteristically according to the condition of a road in contact with the tire or a trouble with the tire. They have discovered that by detecting the vibration as the vibration of the tire itself, the vibration of a wheel or suspension transmitted from the tire, or a small change on the time axis of the pressure of a gas (generally air) filled in the tire, the condition of the road and the running state of the tire can be estimated accurately. The present invention has been accomplished based on this finding.

That is, according to a first aspect of the present invention, there is provided a method of estimating the condition of a road and the running state of a tire, comprising the steps of:

detecting the vibration of a tire, wheel or suspension of a running car; and detecting the vibration level of a vibration spectrum obtained by analyzing the frequency of the above vibration to estimate the condition of the road in contact with the tire at the time of running and the running state of the tire.

According to a second aspect of the present invention, there is provided a method of estimating the condition of a road and the running state of a tire, comprising the steps of:

detecting a change in the pressure of a gas filled in the tire of a running car; and detecting the pressure change level of a pressure change spectrum obtained by analyzing the frequency of the above pressure change to estimate the condition of the road at the time of running and the running state of the tire.

According to a third aspect of the present invention, there is provided a method of estimating the condition of a road and the running state of a tire, wherein the inside pressure of the tire is detected from the absolute value of the output of a pressure sensor installed in the tire, and a micro-vibration component on the time axis of the output is detected and taken as a change in the pressure of the gas filled in the tire.

According to a fourth aspect of the present invention, there is provided a method of estimating the condition of a road and the running state of a tire, wherein a vibration level or pressure change level at a frequency band of at least 10 to 10,000 Hz of the vibration spectrum or the pressure change spectrum is detected.

According to a fifth aspect of the present invention, there is provided a method of estimating the condition of a road and the running state of a tire, wherein the bandwidth of the frequency band for detecting the vibration level or pressure change level is 10 to 500 Hz.

According to a sixth aspect of the present invention, there is provided a method of estimating the condition of a road and the running state of a tire, wherein the bandwidth of the frequency band for detecting the vibration level or pressure change level is 1 to 100% of that of the detection frequency band.

According to a seventh aspect of the present invention, there is provided a method of estimating the condition of a road and the running state of a tire, wherein the vibration level or pressure change level is detected at three or more frequency bands.

According to an eighth aspect of the present invention, there is provided a method of estimating the condition of a road and the running state of a tire, wherein the estimated value of road friction coefficient is calculated from data ($x_1$ to $x_n$) on the vibration level or pressure change level based on the following equation:

estimated value of road friction coefficient=$1/[1+\exp\{-(a_0+a_1x_1+a_2x_2+\ldots+a_nx_n)\}]$ wherein $a_0$ is a constant, $a_1, a_2, \ldots$ and $a_n$ are coefficients and $x_i$ is a vibration level or pressure change level at a frequency band ($f_i$).

According to a ninth aspect of the present invention, there is provided a method of estimating the condition of a road and the running state of a tire, wherein the coefficient of correlation between the estimated value of road friction coefficient and the road friction coefficient measured in advance is obtained, a frequency band $f_i$ (i=1 to n) for detecting a vibration level or pressure change level used to estimate a road friction coefficient is set to ensure that the correlation coefficient becomes highest, and the estimated value of road friction coefficient is calculated from data $x_i$ (i=1 to n) on vibration level or pressure change level at the set frequency band $f_i$ (i=1 to n). Thereby, the accuracy of the estimated value of road friction coefficient is improved.

According to a tenth aspect of the present invention, there is provided a method of estimating the condition of a road and the running state of a tire, wherein the condition of the road at the time of running and the running state of the tire are estimated from data on car speed in addition to data on the vibration spectrum or pressure change spectrum.

According to an eleventh aspect of the present invention, there is provided a method of estimating the condition of a road and the running state of a tire, wherein the speed of the front wheels and the speed of the rear wheels are detected, and the condition of the road at the time of running and the running state of the tire are estimated from a slip ratio calculated from the detected speed of the front wheels and the detected speed of the rear wheels.

According to a twelfth aspect of the present invention, there is provided a method of estimating the condition of a road and the running state of a tire, wherein the pattern pitch frequency of the tire is detected from data on car speed, a vibration level or pressure change level at a frequency band including the pattern pitch frequency of the vibration spectrum or pressure change spectrum is detected, and when the detected vibration level or pressure change level exceeds a predetermined threshold value, it is estimated that the tire is hydroplaning.

According to a thirteenth aspect of the present invention, there is provided a method of estimating the condition of a road and the running state of a tire, wherein a vibration level or pressure change level at a frequency band which is not affected by the pattern pitch frequency is obtained, and when the ratio of the vibration level or pressure change level at the pattern pitch frequency band to the obtained vibration level or pressure change level exceeds a predetermined threshold value, it is estimated that the tire is hydroplaning.

According to a fourteenth aspect of the present invention, there is provided a method of estimating the condition of a road and the running state of a tire, wherein the threshold value can be changed.

According to a fifteenth aspect of the present invention, there is provided a method of estimating the condition of a road and the running state of a tire, wherein the condition of the road at the time of running and the running state of the tire are estimated from data on the inside pressure of the tire in addition to data on the vibration spectrum or pressure change spectrum.

According to a sixteenth aspect of the present invention, there is provided a method of estimating the condition of a road and the running state of a tire, wherein the natural vibration frequency of the tire is obtained from data on the vibration spectrum, the inside pressure of the tire is estimated from the relationship between the vibration frequency of the tire and the inside pressure of the tire obtained in advance, and the estimated inside pressure of the tire is used as data on the inside pressure of the tire set forth in the thirteenth aspect.

According to a seventeenth aspect of the present invention, there is provided a method of estimating the condition of a road and the running state of a tire, wherein a pressure change level at a band synchronous with the revolution of the tire out of a frequency band of 10 to 100 kHz is detected from the pressure change spectrum and compared with a pressure change level at the time of normal operation, and when the pressure change is 20% or more higher than that at the time of normal operation, it is estimated that some trouble occurs in the tire.

According to an eighteenth aspect of the present invention, there is provided a method of estimating the condition of a road and the running state of a tire, wherein the condition of the road at the time of running and the running state of the tire are estimated from data on a load applied to each wheel of a car in addition to data on the vibration spectrum or pressure change spectrum.

According to a nineteenth aspect of the present invention, there is provided a method of estimating the condition of a road and the running state of a tire, wherein an information signal indicative of the vibration or pressure change is converted into a digital signal and compressed on the tire or wheel side and transmitted to the car body side, and the compressed signal is restored to its original state and its frequency is analyzed on the car body side.

According to a twentieth aspect of the present invention, there is provided a road condition and tire running state estimation apparatus comprising:

vibration detection means for detecting the vibration of a tire or wheel of a running car;

means of detecting a vibration level at a frequency band included in a frequency range at which the vibration level characteristically changes according to the condition of a road and the running state of the tire, that is, at least 10 to 10,000 Hz of a frequency spectrum obtained by analyzing the frequency of the detected vibration; and means of estimating the condition of the road at the time of running and the running state of the tire from the detected vibration level.

According to a twenty-first aspect of the present invention, there is provided a road condition and tire running state estimation apparatus, wherein the vibration is a vibration in the width direction of the tire or wheel.

According to a twenty-second aspect of the present invention, there is provided a road condition and tire running state estimation apparatus, wherein the vibration is a vibration in the circumferential direction of the tire or wheel.

According to a twenty-third aspect of the present invention, there is provided a road condition and tire running state estimation apparatus, wherein the vibration detection means is mounted on the same substrate or in the same housing as a pressure sensor for monitoring the pressure of a gas filled in the tire. Thereby, the substrate can be shared by the vibration detection means and the pressure sensor, thereby making it possible to reduce the size and cost of the apparatus.

According to a twenty-fourth aspect of the present invention, there is provided a road condition and tire running state estimation apparatus, wherein the vibration detection means or the substrate mounting the vibration detection means is mounted to the tire or wheel.

According to a twenty-fifth aspect of the present invention, there is provided a road condition and tire running state estimation apparatus, wherein the vibration detection means which is mounted to the tire or wheel on the rolling side is driven from the car body side by radio, and the power source of a vibration detection unit is omitted. Since this can eliminate the need for a power source for driving and detecting sensors such as a battery provided on the rolling side, the size and weight of the vibration detection means can be reduced.

According to a twenty-sixth aspect of the present invention, there is provided a road condition and tire running state estimation apparatus comprising:

vibration detection means for detecting the vibration of the suspension of a running car;

means of detecting a vibration level at a frequency band included in the range of at least 10 to 10,000 Hz of a frequency spectrum obtained by analyzing the frequency of the detected vibration; and means of estimating the condition of a road at the time of running and the running state of the tire from the detected vibration level.

The vibration of the tire transmitted to the suspension from the tire is detected to estimate the condition of the road and the running state of the tire.

According to a twenty-seventh aspect of the present invention, there is provided a road condition and tire running state estimation apparatus, wherein the vibration detection means is mounted to a portion integrated with a hub to which a wheel is mounted through a bearing.

According to a twenty-eighth aspect of the present invention, there is provided a road condition and tire running state estimation apparatus comprising:

pressure change detection means for detecting a change in the pressure of a gas filled in the tire of a running car;

means of detecting a pressure change level at a frequency band included in the range of at least 10 to 10,000 Hz of a pressure change spectrum obtained by analyzing the frequency of the detected pressure change; and means of estimating the condition of a road at the time of running and the running state of the tire from the detected pressure change level.

The vibration of the tire transmitted to the gas in the tire from the tire is detected to estimate the condition of the road and the running state of the tire.

According to a twenty-ninth aspect of the present invention, there is provided a road condition and tire running state estimation apparatus, wherein the inside pressure of a tire is detected from the absolute value of the output of a pressure sensor installed in the tire and a micro-vibration component on the time axis of the output is detected and taken as a change in the presser of the gas.

According to a thirtieth aspect of the present invention, there is provided a method of estimating the condition of a road and the running state of a tire, wherein the bandwidth of a frequency band for detecting the vibration level or pressure change level is 1 to 100% of that of the detection frequency band, and the estimated value of road friction coefficient is calculated from data on the vibration level or pressure change level detected at one or a plurality of frequency bands based on the following equation:

estimated value of road friction coefficient=$1/[1+\exp\{-(a_0+a_1x_1+a_2x_2+\ldots+a_nx_n)\}]$ wherein $a_0$ is a constant, $a_1, a_2, \ldots$ and $a_n$ are coefficients, and $x_i$ is a vibration level or pressure change level at a frequency band ($f_i$).

According to a thirty-first aspect of the present invention, there is provided a road condition and tire running state estimation apparatus, wherein signal processing means is provided on the tire or wheel side, a vibration information signal detected by the vibration detection means or a pressure change information signal detected by the pressure change detection means is converted into a digital signal, compressed and transmitted to the car body side, the compressed signal is received and restored to its original state, and its frequency is analyzed on the car body side.

The volume of data is thus reduced by applying digital data compression technology to be transmitted, thereby making possible continuous data communication and the improvement of the detection accuracy of the vibration level or pressure change level.

According to a thirty-second aspect of the present invention, there is provided a road condition and tire running state estimation apparatus, wherein signal processing means is provided on the tire or wheel side, the condition of a road at the time of running and the running state of a tire are estimated by analyzing the frequency of a vibration information signal detected by the vibration detection means or the frequency of a pressure change information signal detected by the pressure change detection means on the tire or wheel side, and the estimated data on the condition of the road at the time of running and the running state of the tire is transmitted to the car body side. This makes possible continuous data communication by reducing the volume of data to be transmitted.

According to a thirty-third aspect of the present invention, there is provided a road condition and tire running state estimation apparatus, wherein an antenna function for carrying out the communication of the data is provided to a tire valve installed in a wheel.

According to a thirty-fourth aspect of the present invention, there is provided a road condition and tire running state estimation apparatus, wherein an antenna for carrying out the communication of the data is installed at the periphery of a wheel rim.

According to a thirty-fifth aspect of the present invention, there is provided a road condition and tire running state estimation apparatus, further comprising a reset button for initializing vibration information or pressure change information, or a system for initializing the vibration information or pressure change information automatically by collating car behavior data information including one or more of wheel speed, car body acceleration and car body rotation angle speed with information from the estimation apparatus.

Thereby, the vibration information or pressure change information which differs according to the types of a car, wheel and tire is initialized, thereby making it possible to further improve the estimation accuracy of the condition of the road and the running state of the tire.

According to a thirty-sixth aspect of the present invention, there is provided a road condition and tire running state estimation apparatus, wherein each wheel of a car is provided with a load measuring instrument to estimate the condition of a road at the time of running and the running state of a tire from data on the load of each wheel. Thereby, as the condition of the road and the running state of the tire can be estimated from data on the load of each wheel even in a large-sized truck in which a load applied to each wheel greatly changes, the estimation accuracy can be improved.

According to a thirty-seventh aspect of the present invention, there is provided a car control apparatus comprising the road condition and tire running state estimation apparatus of any one of the thirtieth to thirty-sixth aspects and car control means for controlling the running state of a car based on the condition of a road and/or the running state of a tire estimated by the apparatus, such as ABS brake oil pressure control means, wheel lock control means or car attitude control means.

According to a thirty-eighth aspect of the present invention, there is provided a road condition estimation method for estimating a road friction coefficient by detecting at least one of a tire vibration, wheel vibration, suspension vibration and a change in the inside pressure of the tire and detecting the vibration level of a vibration spectrum or the pressure change level of a pressure change spectrum obtained by analyzing the frequency of the vibration or the pressure change, wherein the ON/OFF state of a brake switch is detected, and when it is judged that the brake is stepped on, the updating of the estimated value of road friction coefficient is suspended to switch to a conventional ABS control system for controlling based on the acceleration of the wheel.

Since the estimation of a road friction coefficient by this method is not carried out after the brake is stepped on, it is possible to prevent the system from malfunction by a slip of the tire.

According to a thirty-ninth aspect of the present invention, there is provided a road condition estimation method, wherein the slip ratio is calculated by detecting the speed of a driving wheel and the speed of a coupled driving wheel, and when the slip ratio exceeds the preset threshold value, the updating of the estimated value of road friction coefficient is suspended.

In the case of a two-wheel drive car, a slip of the tire can be known by detecting a slip ratio corresponding to the speed difference between the driving wheel and the coupled driving wheel caused by stepping on the brake, the estimation of a road friction coefficient can be suspended according to a slip of the tire and the malfunctioning of the system can be prevented without fail.

According to a fortieth aspect of the present invention, there is provided a road condition estimation method, wherein the engine speed is detected, and when the engine speed exceeds the preset threshold value, the updating of the estimated value of road friction coefficient is suspended.

Since all the wheels are driven in a four-wheel drive car, the engine speed is detected, and when the engine speed exceeds the threshold value, it can be judged that torque becomes too high and the tire slips easily. Therefore, the estimation of a road friction coefficient can be suspended according to a slip of the tire and the malfunctioning of the system can be prevented without fail.

According to a forty-first aspect of the present invention, there is provided a road condition estimation method, wherein the threshold value of the engine speed is changed according to the connection state of a running gear and clutch.

According to a forty-second aspect of the present invention, there is provided a road condition estimation method, wherein the bandwidth of a frequency band for detecting the vibration level or pressure change level is 1 to 100% of that of the detection frequency band, and a road friction coefficient is estimated from data on the vibration level or pressure change level detected at one or a plurality of frequency bands based on the following equation:

$$\text{estimated value of road friction coefficient} = 1/[1+\exp\{-(a_0+a_1x_1+a_2x_2+\ldots+a_nx_n)\}]$$

wherein $a_0$ is a constant, $a_1, a_2, \ldots$ and $a_n$ are coefficients and $x_i$ is a vibration level or pressure change level at a frequency band ($f_i$).

According to a forty-third aspect of the present invention, there is provided a road condition estimation apparatus for estimating a road friction coefficient by detecting at least one of a tire vibration, wheel vibration, suspension vibration and a change in the inside pressure of the tire and detecting the vibration level of a vibration spectrum or the pressure change level of a pressure change spectrum obtained by analyzing the frequency of the vibration or the pressure change, wherein the apparatus comprises means for detecting the ON/OFF state of a brake switch, and when it is judged that the brake is stepped on, the updating of the estimated value of road friction coefficient is suspended.

According to a forty-fourth aspect of the present invention, there is provided a road condition estimation apparatus for estimating a road friction coefficient by detecting at least one of a tire vibration, wheel vibration, suspension vibration and a change in the inside pressure of the tire and detecting the vibration level of a vibration spectrum or the pressure change level of a pressure change spectrum obtained by analyzing the frequency of the vibration or the pressure change, wherein the apparatus comprises means of detecting the speeds of a driving wheel and a coupled driving wheel and means of calculating a slip ratio from the detected speeds of the driving wheel and the coupled driving wheel, and when the slip ratio exceeds the preset threshold value, the updating of the estimated value of road friction coefficient is suspended.

According to a forty-fifth aspect of the present invention, there is provided a road condition estimation apparatus for estimating a road friction coefficient by detecting at least one of a tire vibration, wheel vibration, suspension vibration and a change in the inside pressure of the tire and detecting the vibration level of a vibration spectrum or the pressure change level of a pressure change spectrum obtained by analyzing the frequency of the vibration or the pressure change, wherein the apparatus comprises means of detecting an engine speed, and when the engine speed exceeds the preset threshold value, the updating of the estimated value of road friction coefficient is suspended.

According to a forty-sixth aspect of the present invention, there is provided a road condition estimation apparatus, wherein means of detecting the connection state of a running gear and clutch is provided, and the threshold value of the engine speed is changed according to the connection state of the running gear and clutch. Thereby, high-accuracy control is made possible.

According to a forty-seventh aspect of the present invention, there is provided a road condition estimation apparatus, wherein an information signal indicative of the vibration or pressure change is converted into a digital signal and compressed on the tire, wheel or suspension side and transmitted to the car body side, and the compressed signal is received and restored to its original state and its frequency is analyzed on the car body side.

According to a forty-eighth aspect of the present invention, there is provided an ABS brake control method comprising the steps of:

detecting at least one of a tire vibration, wheel vibration, suspension vibration and a change in the inside pressure of a tire;

detecting the vibration level of a vibration spectrum or the pressure change level of a pressure change spectrum obtained by analyzing the frequency of the vibration or the pressure change to estimate a road friction coefficient continuously; and changing the threshold value of the oil pressure of a brake for shifting to ABS control according to the estimated value of road friction coefficient right before a driver steps on the brake.

For example, when the estimated value of road friction coefficient is small, if the threshold value is an ordinary value, the slip ratio becomes high quickly and brake force lowers. Therefore, in this case, the threshold value of the oil pressure of the brake for shifting to ABS control is reduced so that the ABS brake is activated earlier to prevent a rise in slip ratio, thereby improving the safety of the car.

According to a forty-ninth aspect of the present invention, there is provided an ABS brake control method comprising the steps of:

detecting at least one of a tire vibration, wheel vibration, suspension vibration and a change in the inside pressure of a tire;

detecting the vibration level of a vibration spectrum or the pressure change level of a pressure change spectrum obtained by analyzing the frequency of the vibration or the pressure change to estimate a road friction coefficient continuously; and adjusting a change in the oil pressure of an ABS brake according to the estimated value of road friction coefficient right before a driver steps on the brake.

This makes it possible to carry out ABS braking stably.

According to a fiftieth aspect of the present invention, there is provided an ABS brake control method, wherein the bandwidth of a frequency band for detecting the vibration level or pressure change level is 1 to 100% of that of the detection frequency band, and a road friction coefficient is continuously estimated from data on the vibration level or pressure change level detected at one or a plurality of frequency bands based on the following equation:

estimated value of road friction coefficient=$1/[1+\exp\{-(a_0+a_1x_1+a_2x_2+ \ldots +a_nx_n)\}]$ wherein $a_0$ is a constant, $a_1, a_2, \ldots$ and $a_n$ are coefficients and $x_i$ is a vibration level or pressure change level at a frequency band ($f_i$).

According to a fifty-first aspect of the present invention, there is provided an ABS brake control apparatus comprising:

means of detecting at least one of a tire vibration, wheel vibration, suspension vibration and a change in the inside pressure of a tire;

means of detecting the vibration level of a vibration spectrum or the pressure change level of a pressure change spectrum obtained by analyzing the frequency of an information signal indicative of the detected vibration or the detected pressure change to calculate the estimated value of road friction coefficient continuously from the following equation;

means of detecting the ON/OFF state of a brake switch; and means of changing the threshold value of the oil pressure of a brake for shifting to ABS control according to the estimated value of road friction coefficient right before a driver steps on the brake:

estimated value of road friction coefficient=$1/[1+\exp\{-(a_0+a_1x_1+a_2x_2+ \ldots +a_nx_n)\}]$ wherein $a_0$ is a constant, $a_1, a_2, \ldots$ and $a_n$ are coefficients and $x_i$ is a vibration level or pressure change level at a frequency band ($f_i$).

According to a fifty-second aspect of the present invention, there is provided an ABS control apparatus comprising:

means of detecting at least one of a tire vibration, wheel vibration, suspension vibration and a change in the inside pressure of a tire;

means of detecting the vibration level of a vibration spectrum or the pressure change level of a pressure change spectrum obtained by analyzing the frequency of an information signal indicative of the detected vibration or the detected pressure change to calculate the estimated value of road friction coefficient continuously from the following equation;

means of detecting the ON/OFF state of a brake switch; and means of adjusting a change in the oil pressure of an ABS brake according to the estimated value of road friction coefficient right before a driver steps on the brake:

estimated value of road friction coefficient=$1/[1+\exp\{-(a_0+a_1x_1+a_2x_2+ \ldots +a_nx_n)\}]$ wherein $a_0$ is a constant, $a_1, a_2, \ldots$ and $a_n$ are coefficients and $x_i$ is a vibration level or pressure change level at a frequency band ($f_i$).

According to a fifty-third aspect of the present invention, there is provided a car control apparatus comprising the ABS brake control apparatus of the fifty-first or fifty-second aspect.

DESCRIPTION OF THE PREFERRED EMBODIMENT

Preferred embodiments of the present invention will be described hereinbelow with reference to the accompanying drawings.

Embodiment 1

Figure 1:
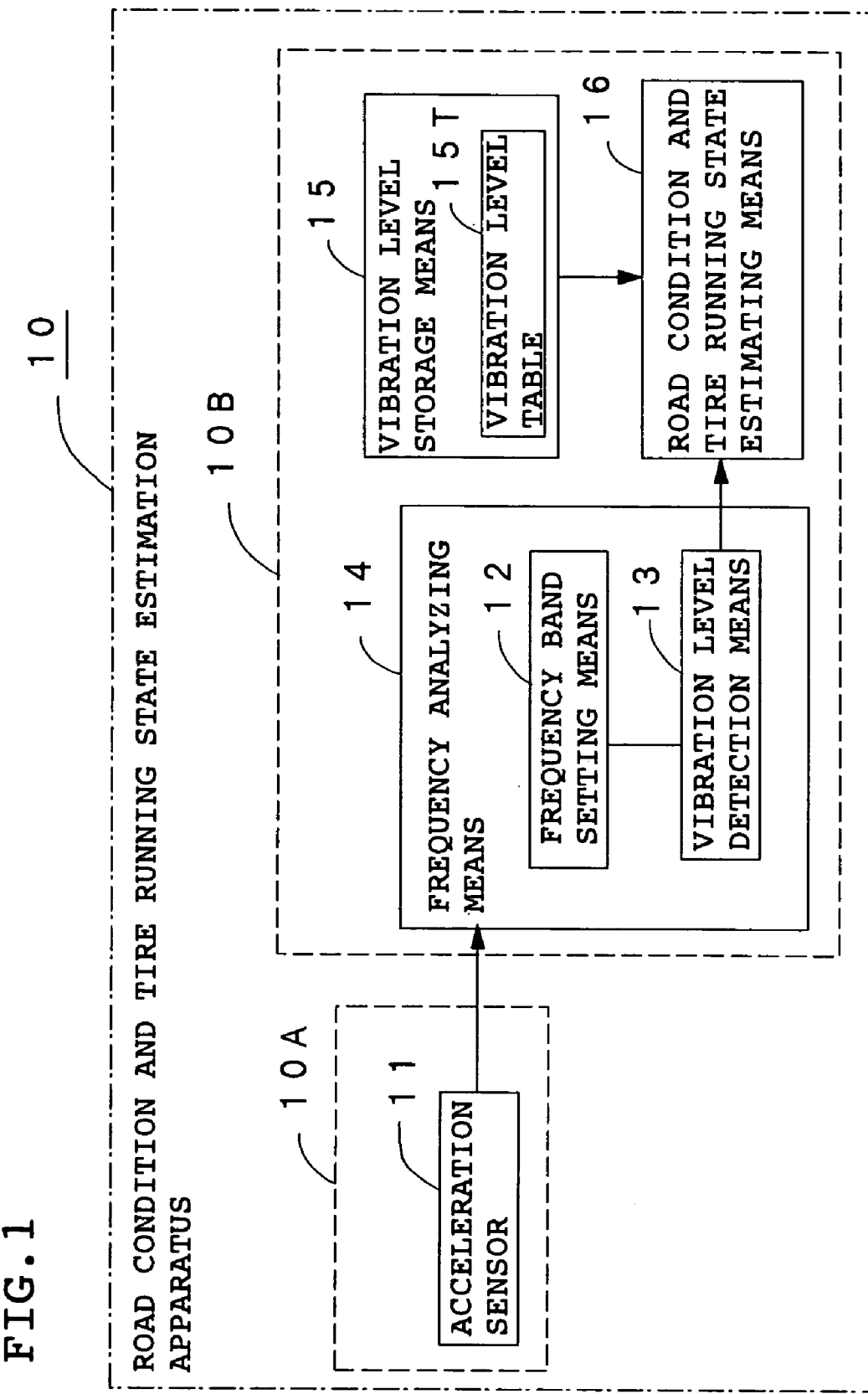
FIG. 1 is a block diagram showing the constitution of a road condition and tire running state estimation apparatus according to Embodiment 1 of the present invention.

FIG. 1 is a block diagram showing the constitution of a road condition and tire running state estimation apparatus 10 according to Embodiment 1 of the present invention. The apparatus 10 comprises a vibration detection unit 10A and a signal processing unit 10B. The vibration detection unit 10A has an acceleration sensor 11 as vibration detection means for detecting the vibration of a tire transmitted to a wheel, and the signal processing unit 10B has frequency analyzing means 14 which comprises frequency band setting means 12 and vibration level detection means 13 and analyzes the frequency of an information signal indicative of the vibration of the wheel detected by the above acceleration sensor 11 to detect a vibration level at a frequency band included in a frequency range where the vibration level characteristically changes according to the condition of a road and the running state of the tire, that is, at least 10 to 10,000 Hz, of the frequency spectrum of the above vibration (to be referred to as "vibration spectrum" hereinafter), vibration level storage means 15 for storing a vibration level table 15T showing the relationship between the condition of a road or the running state of a tire and a vibration level at a predetermined frequency band of the above vibration spectrum which has been obtained in advance, and road condition and tire running state estimation means 16 for estimating a road friction coefficient μ and the running state of a tire from the above vibration level by comparing the vibration level detected by the above frequency analyzing means 14 with the above vibration level table 15T. The condition of the road and the running state of the tire are estimated from the wheel vibration information signal detected by the above acceleration sensor 11.

The above vibration level table 15T is prepared by mounting the acceleration sensor 11 to a test car, causing the test car to run over roads having different road friction coefficients μ at a predetermined speed V, for example, causing a car having a trouble tire part of whose tread has been peeled off and measuring the vibration of the wheel 1.

Figure 2A:
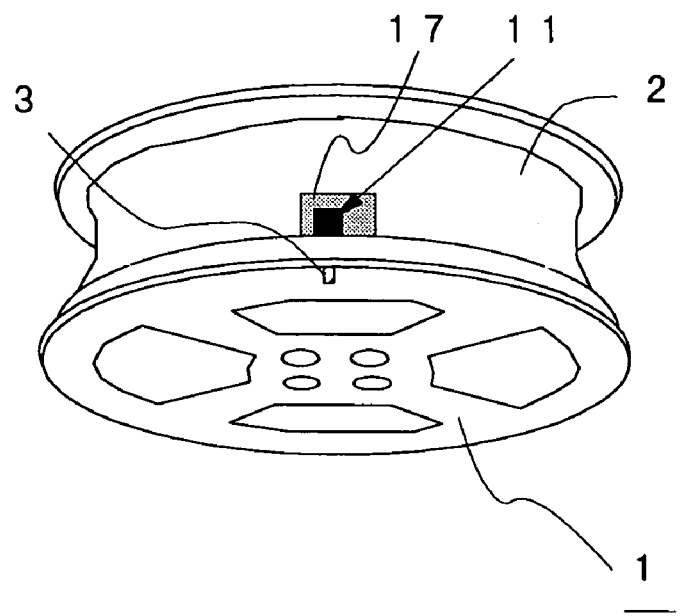
FIGS. 2(A) and 2(B) are diagrams showing the mounting position of an acceleration sensor.
Figure 2B:
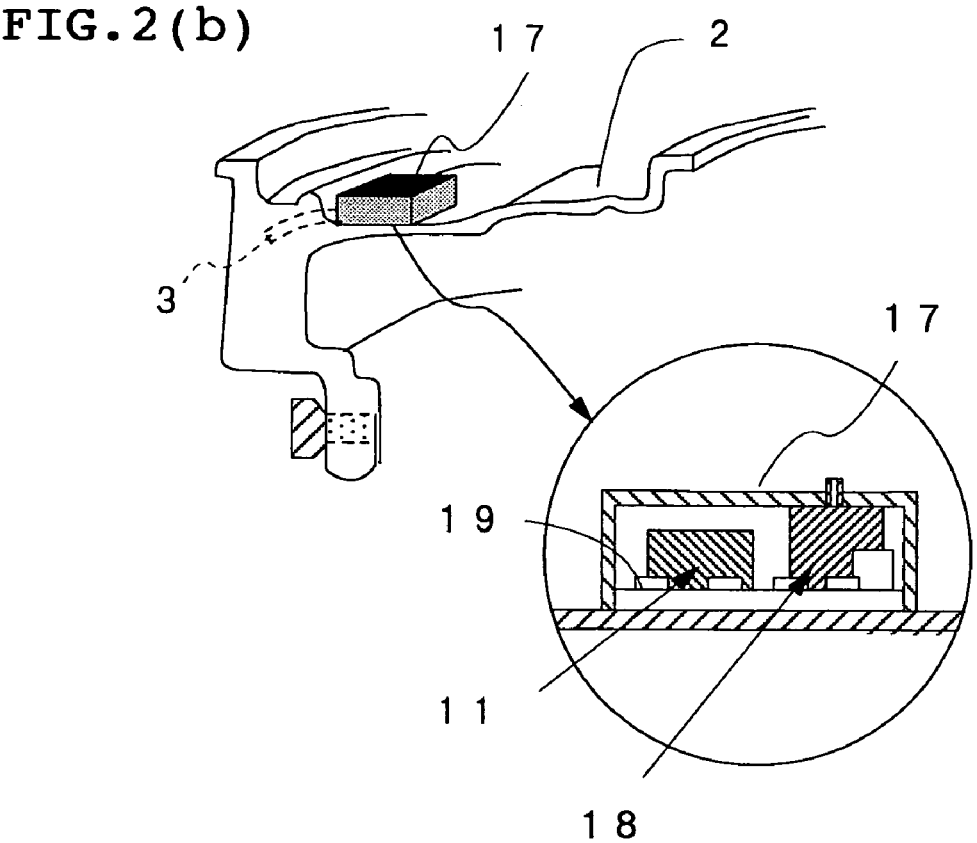

In this embodiment, a bimorph piezoelectric surface-mounted type acceleration sensor is used as the above acceleration sensor 11 and stored in a sensor box 17 mounted on a depressed portion on the tire side of the wheel rim 2 of the wheel as shown in FIGS. 2(A) and 2(B). In these figures, reference numeral 3 denotes a tire valve installed in the wheel 1.

In the above sensor box 17, there is stored a pressure sensor 18 for monitoring the pressure of a gas filled in the tire. The above acceleration sensor 11 is mounted on a substrate 19 which mounts the above pressure sensor 18 having a pressure detection circuit, battery, etc. The substrate 19 is shared by sensors and mounts the drive and detection circuits of the acceleration sensor 11, and the above battery is a power source shared by the acceleration sensor 11 and the pressure sensor 18.

The acceleration sensor 11 or the substrate mounting the acceleration sensor 11 may be installed at a position separate from the above pressure sensor 18 of the wheel 1, or the substrate mounting drive and detection circuits for the acceleration sensor 11 may be installed separately from the acceleration sensor 11. For the downsizing of the apparatus, the acceleration sensor 11 and its substrate are preferably installed in the same sensor box 17 as the pressure sensor 18, and at least the substrate is preferably the above substrate 19.

A description is subsequently given of the operation of the above road condition and tire running state estimation apparatus 10 when the estimated value of road friction coefficient μ is to be obtained.

The vibration of the wheel 1 at the time of running is first detected by the acceleration sensor 11, and the frequency of the detected information signal indicative of the vibration of the wheel 1 is analyzed by the frequency analyzing means 14 to detect a vibration level at a predetermined frequency band. Stated more specifically, the above vibration level to be detected by the frequency analyzing means 14 is a vibration level at a frequency band having a predetermined bandwidth whose center frequency is in a range at which the vibration level changes characteristically according to the condition of the road and the running state of the tire, that is, at least 10 to 10,000 Hz, specifically, a vibration level having a bandwidth which is 1 to 100% of that of the detection frequency band (frequency band of the information signal indicative of the vibration of the wheel 1) in the frequency range of at least 10 to 10,000 Hz. For example, when the above detection frequency band is 10 to 5,000 Hz, the vibration level detected by the frequency analyzing means 14 may be a vibration level at one frequency band having a relatively wide bandwidth, for example, 800 to 3,500 Hz, which is about 54% of that of the above detection frequency band, or vibration levels at a plurality of frequency bands having a relatively narrow bandwidth which are about 4%, 8% and 10% of that of the above detection frequency band, for example, vibration levels at 800 to 1,000 Hz, 1,600 to 2,000 Hz and 3,000 to 3,500 Hz. When there are a plurality of frequency bands for detecting the vibration levels, the above bandwidth is preferably narrow, for example, 10 to 500 Hz. In the frequency analyzing means 14, one or more frequency bands are set by the frequency band setting means 12, and the vibration level(s) at the above frequency band(s) is/are detected by the vibration level detection means 13.

The above detected vibration level(s) is/are transmitted to the road condition and tire running state estimating means 16 which then compares the above detected vibration level(s) with the vibration level table 15T showing the relationship between road friction coefficient μ and vibration level stored in the vibration level storage means 15 in order to obtain the estimated value (μ estimated value) of road friction coefficient, thereby making it possible to estimate a road friction coefficient μ accurately from an information signal indicative of the vibration in the tire circumferential direction or width direction of the wheel detected by the acceleration sensor 11.

Figure 3:
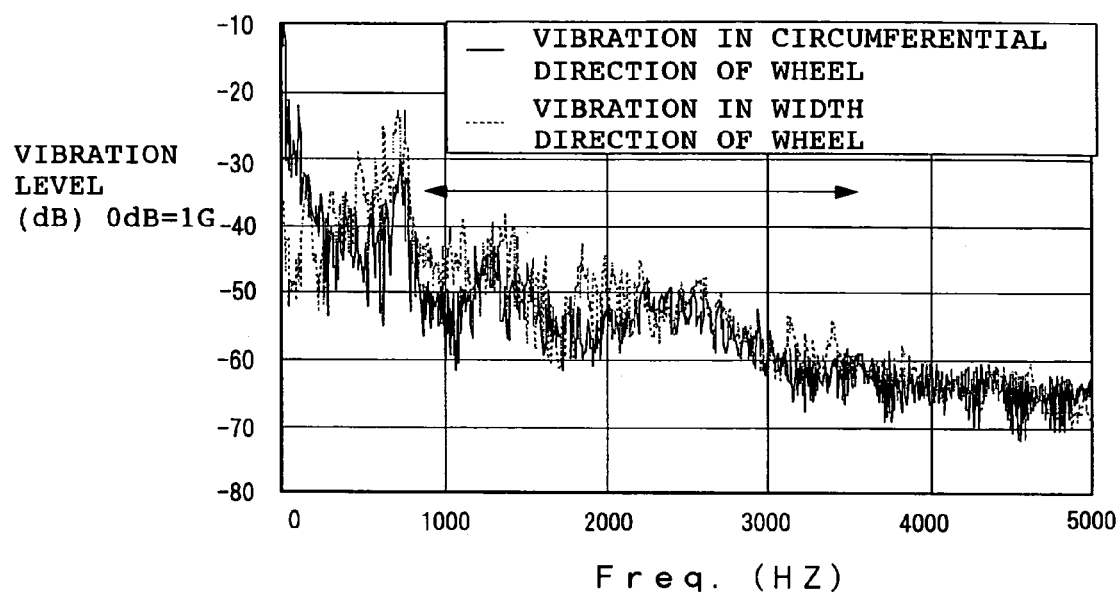
FIG. 3 is a graph showing the vibration spectra of a wheel.

FIG. 3 shows vibration spectra obtained by mounting a tire having a wheel provided with an acceleration sensor for detecting a vibration in the circumferential direction of the tire and an acceleration sensor for detecting a vibration in the width direction of the tire on a car, causing the car to run over an ordinary asphalt road at a constant speed of 60 km/h, measuring the vibration in the tire circumferential direction and the vibration in the tire width direction of the wheel, and analyzing the frequencies of the vibrations. The frequency is plotted on the horizontal axis of the graph and the size of a vibration level when 1G is 0 dB is plotted on the vertical axis. The solid line of the graph shows the vibration spectrum in the tire circumferential direction of the wheel and the broken line shows the vibration spectrum in the tire width direction of the wheel.

The same experiment as above is conducted on various roads which differ from one another in road friction coefficient μ to obtain the vibration spectra in the tire circumferential and width directions of the wheel to be compared with a vibration spectrum obtained by causing the car to run over the above dry asphalt road. Thereby, it can be confirmed how the above vibration levels differ from one another according to the condition of the road at a plurality of frequency bands which are included in the range of 10 to 10,000 Hz.

In general, when the road friction coefficient μ lowers, vibration levels at a plurality of frequency bands are raised by a slip of a tire tread (slip in the width direction).

Figure 4:
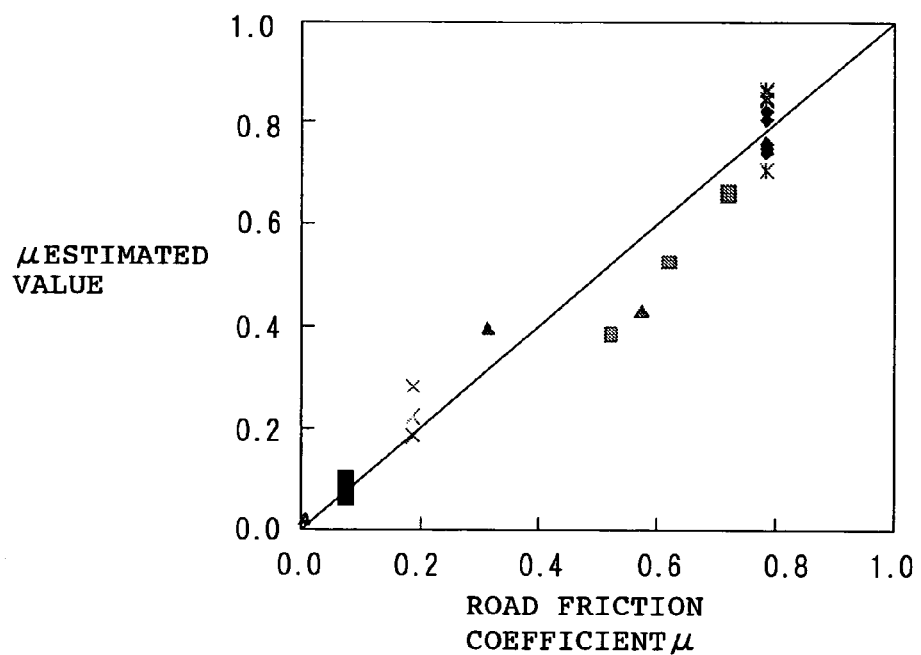
FIG. 4 is a graph showing correlation between the actual road friction coefficient μ and the μ estimated value according to the present invention.

FIG. 4 is a graph showing the relationship between the road friction coefficient μ measured in advance and the estimated value (μ estimated value) of road friction coefficient obtained from the detected information signal indicative of the vibration of the wheel. As obvious from these results, correlation between the above μ estimated value and the actual road friction coefficient μ is good.

Therefore, it can be confirmed that the road friction coefficient μ can be estimated accurately by detecting the vibration in the tire circumferential direction or width direction of the wheel 1 by the acceleration sensor 1 and comparing this vibration information signal with the above vibration level table 15T showing the relationship between vibration levels at a plurality of frequency bands and road friction coefficient μ.

According to Embodiment 1, the frequency of an information signal indicative of the vibration of the wheel 1 detected by the acceleration sensor 11 mounted to the wheel rim 2 is analyzed by the frequency analyzing means 14 to detect the vibration level of the obtained vibration spectrum, and this detected vibration level is compared with the vibration level table 15T showing the relationship between the road friction coefficient μ and the vibration level stored in the vibration level storage means 15 to estimate the road friction coefficient μ. Therefore, the value of road friction coefficient μ can be estimated accurately, and the safety of the car can be improved.

Figure 5A:
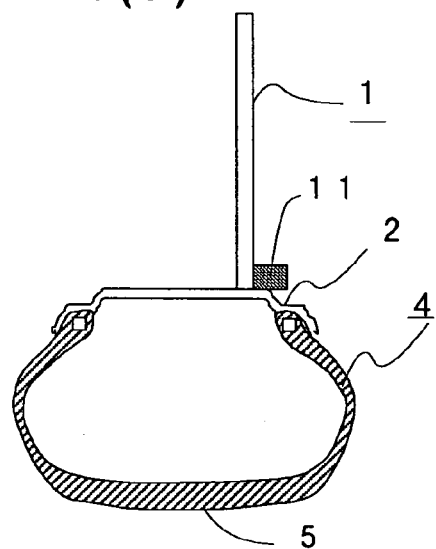
FIGS. 5(A) and 5(B) are diagram showing other mounting positions of the acceleration sensor.
Figure 5B:
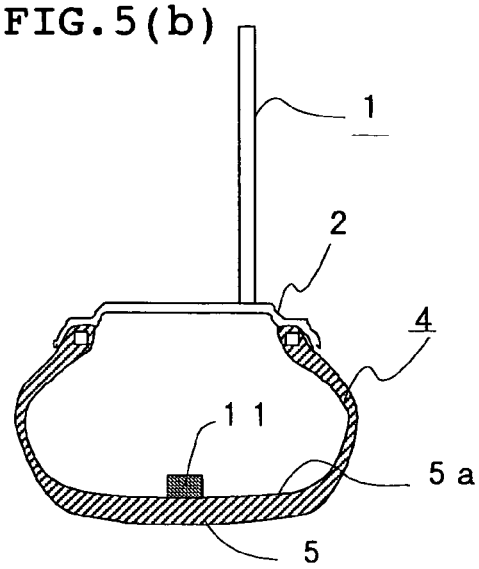

In the above Embodiment 1, the acceleration sensor 11 is mounted on the tire side of the wheel rim 2 to detect the vibration of the tire transmitted to the wheel 1. As shown in FIG. 5(A), the acceleration sensor 11 may be mounted on the wheel disk side of the wheel rim 2. Alternatively, as shown in FIG. 5(B), the acceleration sensor 11 may be mounted on the inner side 5a of the tread 5 of the tire 4 so as to directly detect the vibration of the tire 4.

In the above embodiment, the road friction coefficient μ is estimated. However, not the road friction coefficient μ but the condition of a road such as the ordinary condition of a road (dry), the condition of a road which needs attention (wet road, road covered with snow, etc.) or the dangerous condition of a road (hydroplaning, road covered with compressed snow, road having a mirror surface, etc.) may be estimated.

Or, slipperiness which is a condition of a running tire may be estimated from the above road friction coefficient μ.

In the above embodiment, the frequency band for detecting a vibration level for calculating a μ estimated value is a frequency band at which the vibration level changes characteristically, selected by the comparison of vibration spectra obtained by causing a car to run over different roads. When this frequency band is a high frequency band having high correlation with the road friction coefficient μ, the accuracy of the μ estimated value can be further improved.

Stated more specifically, the acceleration sensor 11 is mounted on a test car, the car is caused to run over roads in different conditions (road friction coefficient μ) at a predetermined speed V to obtain the vibration spectra of the tire, and the frequency band value (vibration level) $x_i$ (i=1 to n) of a vibration level at at least one frequency band $f_i$ (i=1 to n) is detected to calculate the estimated value of road friction coefficient (μ estimated value) from the following equation (1).

$$\mu \text{ estimated value} = 1/[1+\exp\{-(a_0+a_1x_1+a_2x_2+ \ldots +a_nx_n)\}] \quad (1)$$

wherein $a_0$ is a constant, and $a_1, a_2, \ldots$ and $a_n$ are coefficients.

The coefficient of correlation between the μ estimated value calculated from the above equation (1) and the road friction coefficient μ measured in advance is obtained to set the above plurality of frequency bands $f_i$ (i=1 to n) so that the coefficient of correlation becomes the highest, and the μ estimated value is calculated from vibration levels at the set frequency bands $f_i$ (i=1 to n) based on the above equation (1).

When the frequency bands $f_i$ (i=1 to n) for detecting vibration levels for calculating a μ estimated value are set to frequency bands $f_i$ (i=1 to n) having high correlation with the road friction coefficient μ, the accuracy of the μ estimated value can be improved without fail, as compared with a case where the μ estimated value is calculated by setting a plurality of frequency bands $f_i$ which are considered to have a large frequency band value $x_i$ from the comparison of vibration spectra obtained simply by causing a car to run over different roads.

The number of the frequency bands $f_i$ for detecting the frequency band value (vibration level) $x_i$ of a vibration used for the detection of the above road friction coefficient μ is preferably 3 or more but may be 1 if it is a frequency band $f_i$ which reflects the condition of a road (road friction coefficient μ) well.

By using the above method, the vibration level storage means 15 can be omitted from the above apparatus 10, and the road condition and tire running state estimating means 16 can obtain the μ estimated value directly from the frequency band value (vibration level) $x_i$ of a vibration detected by the frequency analyzing means 12 based on the above equation (1) and estimate the condition of the road using the above μ estimated value.

It is also possible to estimate a trouble with the tire from the above vibration spectrum. More specifically, when part of a tire tread peels off, a special vibration occurs each time the part contacts the road, a vibration level at a frequency band of 10 to 100 Hz of the above vibration spectrum is detected and compared with the vibration level at the same frequency band of a normal tire so that it can be estimated whether some trouble occurs in the tire or not.

By detecting the frequency of the natural vibration of the tire from the vibration level at a frequency band of 200 Hz or less of a vibration spectrum obtained by the frequency analysis of a vibration information signal from the above acceleration sensor 11, the inside pressure of the tire can be estimated. That is, since there is high correlation between the frequency of the natural vibration of the tire and the actual inside pressure of the tire, the frequency of the natural vibration of the tire is obtained from data on the above vibration spectrum, the inside pressure of the tire is estimated from the relationship between the frequency of the natural vibration of the tire and the inside pressure of the tire, which is obtained in advance, and this estimated inside pressure of the tire may be used as the inside pressure of the tire. Thereby, the pressure sensor 18 installed in the sensor box 17 may be omitted.

When a load applied to each-wheel of a car is detected by mounting a load measuring instrument to each wheel of the car and the condition of a road at the time of running and the running state of a tire are estimated based on data on the load of each wheel of the car, the estimation accuracy of the condition of the road and the running state of the tire can be further improved.

That is, in a large-sized truck in which a load applied to each wheel greatly changes according to the weight of freight, as the friction coefficient greatly changes according to the load, the vibration state of the tire changes according to the load (as the load becomes larger, the friction coefficient decreases but the car hardly slips). To compensate for this, the vibration level table 15T showing the relationship between the road friction coefficient μ and the vibration level is prepared for each load and stored, and the condition of a road and the running state of a tire are estimated based on data on the load of each wheel detected by the load measuring instrument comprising a distortion gauge, thereby making it possible to further improve the estimation accuracy.

Preferably, a reset button for initializing the system is provided in the apparatus 10 in order to know the actual friction state between the tire and the road after running a certain distance. There is no problem when the vibration spectrum used to estimate the condition of the road is the vibration spectrum of the actual test car which is input in advance. Since the vibration spectrum differs slightly according to the types of a car, wheel and tire, the car is caused to run over one of a dry road, wet road and road covered with ice and snow, or a plurality of roads to obtain vibration spectra at a certain time, and the condition of a road or a road friction confident μ is estimated based on the obtained vibration spectra, thereby making it possible to further improve the estimation accuracy.

At this point, a passenger depresses the reset button and inputs whether the road is dry, wet or covered with ice and snow. The apparatus 10 compares the vibration spectrum for each condition of a road stored in advance with the vibration spectrum obtained at the time of initialization to automatically input whether the condition of the road is dry, wet or covered with ice and snow.

Alternatively, a car equipped with sensors for detecting the speed of a wheel, car acceleration, the speed of car rotation angle, etc. for the control of the behavior of the car body may be provided with a system for resetting suitably by comparison between a road friction coefficient roughly estimated from these data and a road friction coefficient estimated by the apparatus 10.

Embodiment 2

Figure 6:
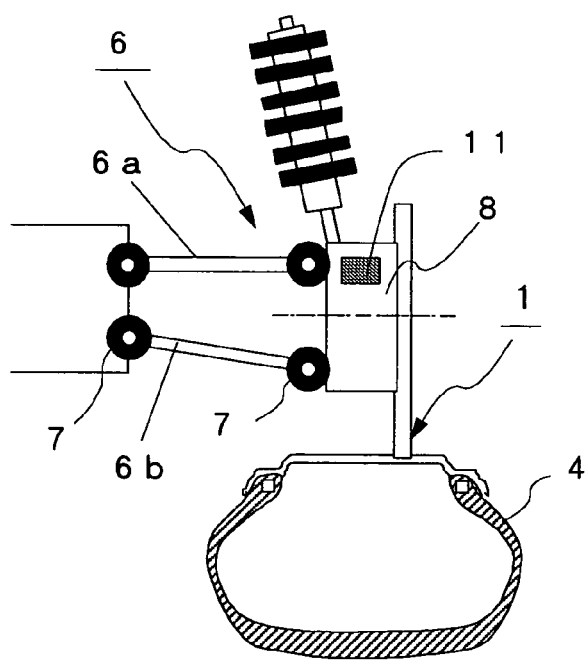
FIG. 6 is a diagram showing a method of detecting the vibration of a suspension according to Embodiment 2 of the present invention.

In the above Embodiment 1, the vibration of the wheel 1 is detected. As shown in FIG. 6, the acceleration sensor 11 is mounted to the suspension 6 to detect the vibration of the tire transmitted to the suspension 6 so as to estimate the condition of the road and the running state of the tire.

Since the suspension 6 is provided with a plurality of elastic members such as rubber boots 7 as vibration buffers, the transmitted vibration of the tire can be efficiently detected in this embodiment. Therefore, the acceleration sensor 11 is mounted to a non-rotary portion integrated with a hub 8 to which the wheel 1 is mounted and not to suspension arms 6a and 6b. As a vibration in the tire width direction is transmitted to the suspension 6 without being attenuated, the above acceleration sensor 11 is preferably mounted to detect a vibration in the tire width direction of the hub 8.

Figure 7:
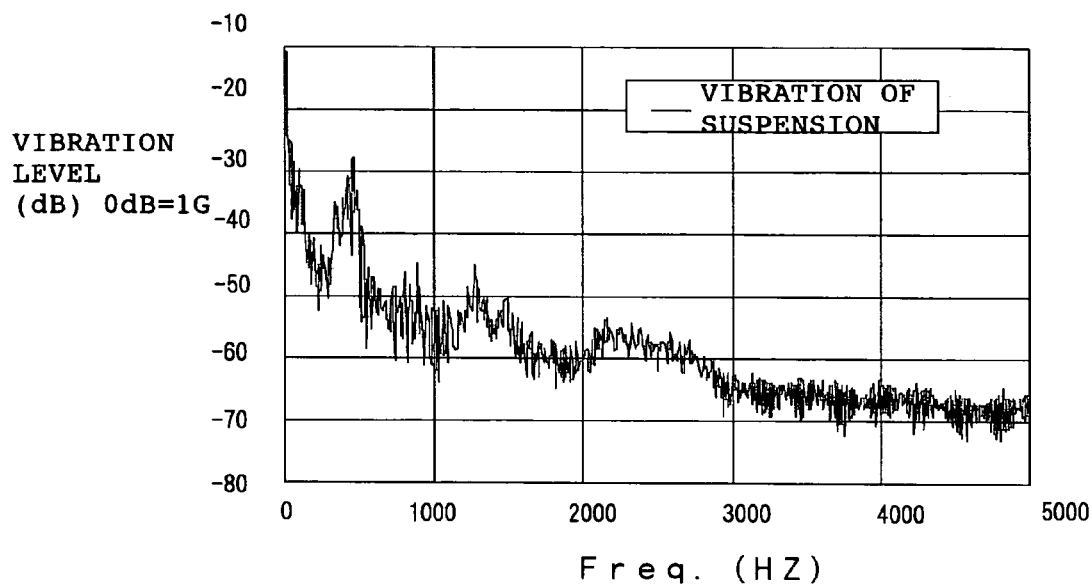
FIG. 7 is a graph showing the vibration spectrum of a suspension.

FIG. 7 shows a vibration spectrum obtained by analyzing the frequency of the vibration of the suspension 6 when the acceleration sensor 11 is mounted to the suspension of a passenger car and the car is caused to run over an ordinary dry asphalt road at a constant speed of 30 to 90 km/h. The road friction coefficient $\mu$ can be estimated from this vibration spectrum in the same manner as in the above Embodiment 1.

Figure 8:
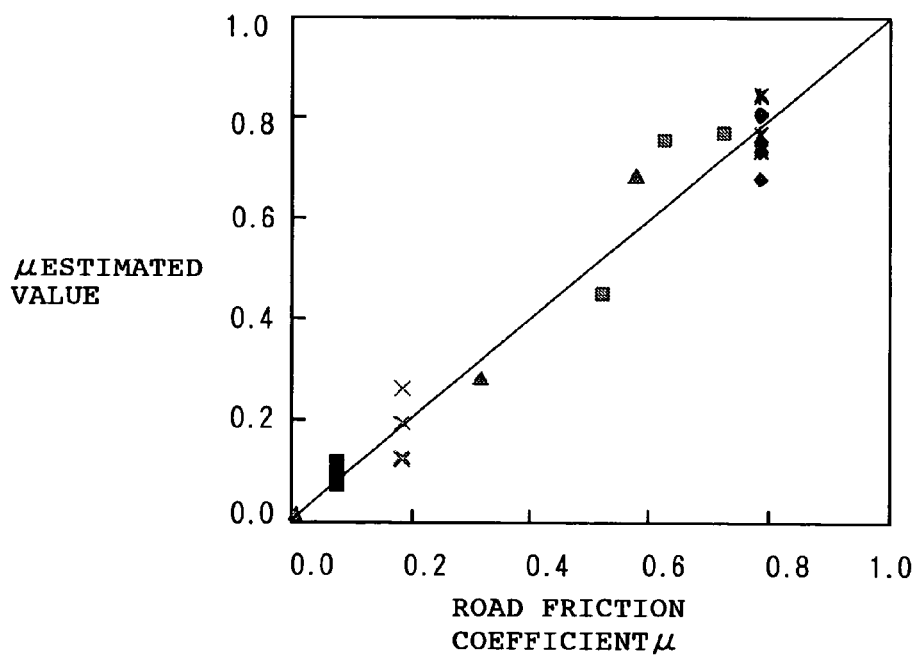
FIG. 8 is a graph showing correlation between the actual road friction coefficient μ and the μ estimated value obtained by detecting the vibration of a suspension.

FIG. 8 is a graph showing the relationship between the road friction coefficient $\mu$ measured in advance and the $\mu$ estimated value obtained from the detected vibration of the suspension 6. As obvious from the results, the graph shows good correlation between the $\mu$ estimated value obtained from the detected vibration level and the actual road friction coefficient $\mu$. It can be understood from this that the road friction coefficient $\mu$ can be estimated from the vibration of the suspension 6 accurately.

Embodiment 3

Figure 9:
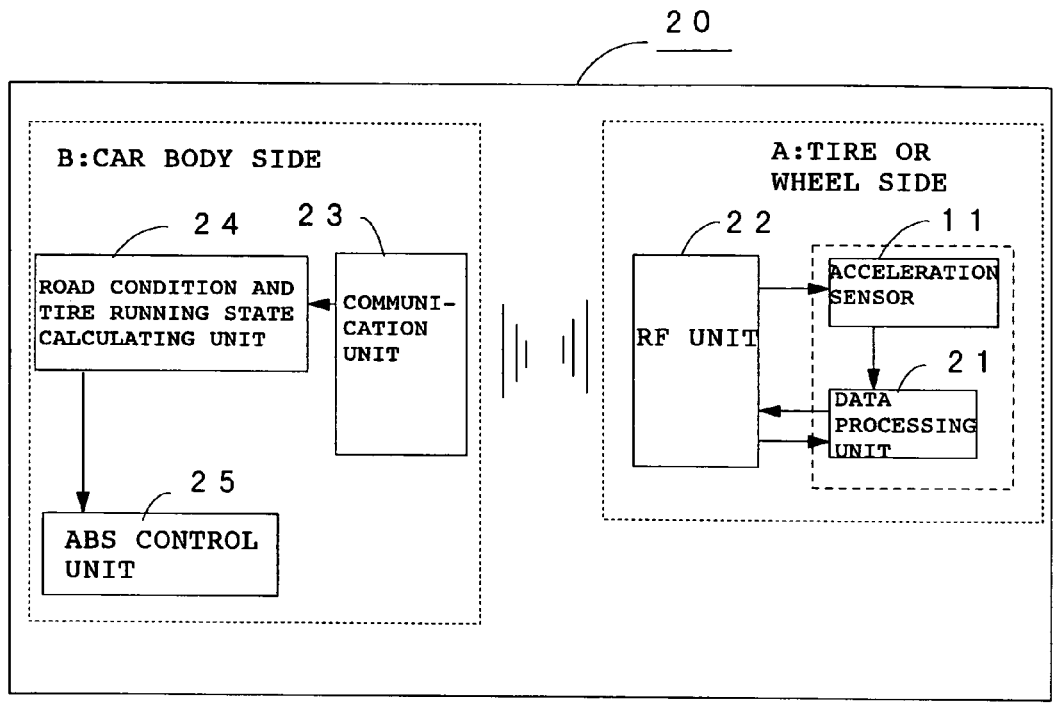
FIG. 9 is a block diagram showing the constitution of a car control apparatus according to Embodiment 3 of the present invention.

FIG. 9 shows the constitution of a car control apparatus 20 which comprises the road condition and tire running state estimation apparatus of the present invention. The apparatus 20 interconnects a rolling side (tire or wheel side) A to which the acceleration sensor 11 is mounted and a car body side B which is not rolling by radio.

On the rolling side, there are provided the acceleration sensor 11, a data processing unit 21 for converting a vibration information signal detected by the acceleration sensor 11 into a digital signal and compressing the digital signal, and an RF (Radio Frequency) unit 22 for transmitting the compressed signal to the car body side B by radio and receiving radio signals for driving the acceleration sensor 11 and the data processing unit 21, transmitted from the car body side B. On the car body side B, there are provided a radio transmission/reception unit (to be referred to as "communication unit" hereinafter) for receiving the above compressed vibration information signal and transmitting the above radio signals to the rolling side A, a road condition and tire running state calculating unit 24 for restoring the above received vibration information signal to its original state to analyze its frequency and estimating the condition of a road at the time of running and the running state of a tire from the obtained vibration spectrum, and an ABS control unit (car control means) 25 for controlling the oil pressure of an ABS brake based on the condition of the road and the running state of the tire estimated by the above calculating unit 24.

Thereby, the vibration information signal detected on the tire or wheel side is processed on the car body side B to estimate the condition of the road and the running state of the tire without providing a signal connection line. Since the oil pressure of the ABS brake can be controlled according to the condition of the road and the running state of the tire by transmitting data on the estimated condition of the road and the estimated running state of the tire to the ABS control unit 25, the running state of the car can be stably controlled. Since the acceleration sensor 11 and the data processing unit 21 are driven by radio from the car body side, a battery provided on the rolling side A can be omitted.

The above road condition and tire running state calculating unit 24 has the same constitution as the signal processing unit 10B of the road condition and tire running state estimation device 10 shown in FIG. 1 of Embodiment 1.

An antenna for expanding the radio wave service area on the circumference of the tire as much as possible is provided on the car body side B, and the RF unit 22 on the rolling side A (tire or wheel side) has a passive mode non-contact IC chip which is activated by induced electromotive force generated by receiving a weak radio wave from the communication unit 23 through the antenna, activates the acceleration sensor 11 and the data processing unit 21, and converts and compresses vibration data detected by the acceleration sensor 11 to transmit the compressed data to the car body side A. The antenna function for transmitting the above data may be provided to a tire valve (see FIG. 1) installed in the wheel 1, or the antenna may be provided at the periphery of the wheel rim 2.

When the vibration of a rolling wheel was actually detected with the apparatus 20 and its vibration spectrum was measured on the car body side B to be compared with the vibration spectra shown in FIG. 3 of the above Embodiment 1, it was confirmed that they were similar to each other.

Thus, according to this Embodiment 3, the data processing unit 21 is provided on the rolling side A (tire or wheel side) on which the acceleration sensor 11 is mounted, the vibration information signal detected by the above acceleration sensor 11 is converted into a digital signal and compressed to be transmitted to the car body side B, and the above vibration information signal is restored to its original state by the road condition and tire running state calculating unit 24 provided on the car body side B to analyze its frequency so as to estimate the conditions of the road and the running state of the tire from the vibration of the tire or wheel. Therefore, continuous data communication between the rolling side A and the car body side B becomes possible, thereby making it possible to improve the detection accuracy of vibration and to control the running state of the car stably.

Since the acceleration sensor 11 and the data processing unit 21 are driven by radio from the car body side B, a battery can be omitted and the vibration detection unit can be reduced in size and weight. When data communication is carried out by using a battery, the service life of the battery becomes short and must be exchanged. However, this embodiment does not involve this problem and makes it possible to estimate the condition of the road and the running state of the tire stably for a long time.

Figure 10:
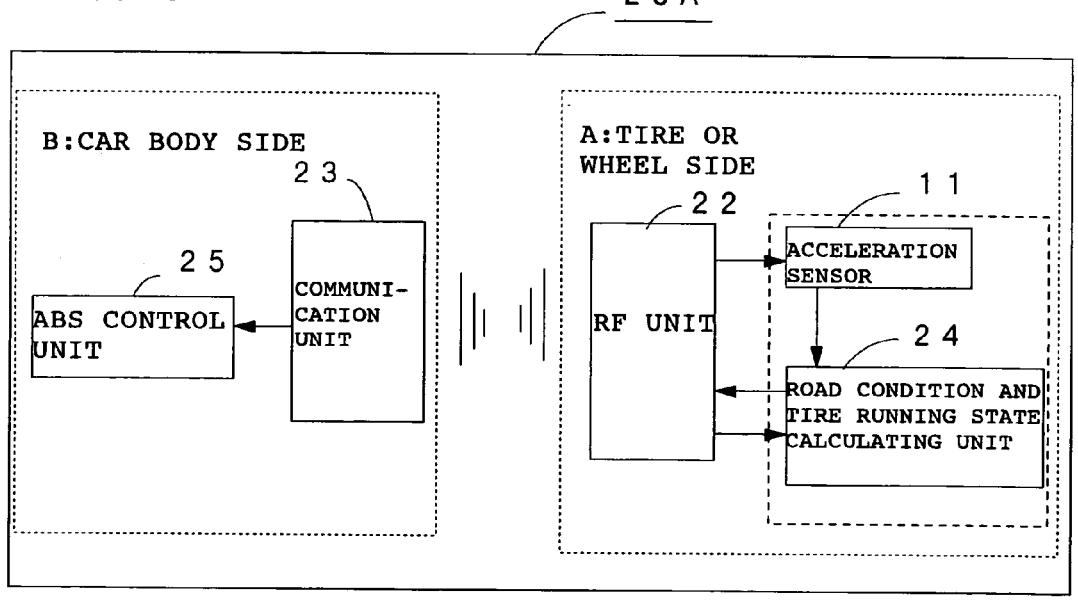
FIG. 10 is a block diagram showing the constitution of another car control apparatus according to the present invention.

The tire or wheel may be provided with an FFT processing unit to analyze the frequency of the vibration information signal on the rolling side A so as to obtain a $\mu$ estimated value and transmit it to the car body side B. Stated more specifically, as shown in FIG. 10, the road condition and tire running state calculating unit 24 is provided on the rolling side A (tire or wheel side) to analyze the frequency of the information signal indicative of the vibration of the tire or wheel detected by the acceleration sensor 11 so as to estimate the condition of the road and the running state of the tire, and data on the estimated condition of the road and the estimated running state of the tire are transmitted to the car body side B from the RF unit 22. On the car body side B, the received data is transmitted to the ABS control unit 25 to control the oil pressure of the ABS brake.

By constructing the above car control apparatus 20A, continuous data communication between the rolling side A and the car body side B is made possible as in the above Embodiment 3, and the estimation accuracy of the condition of the road and the running state of the tire can be thereby improved to control the running state of the car stably.

When the μ estimated value was obtained from a vibration spectrum obtained by actually analyzing the frequency of the vibration information signal on the tire or wheel side and transmitted to the car body side B to be compared with the road friction coefficient μ, the same good correlation as in FIG. 4 of the above Embodiment 1 was observed.

Embodiment 4

In the above Embodiments 1 and 2, the frequency of the information signal indicative of the vibration of the tire 4, wheel 1 or suspension 6 detected by the acceleration sensor 11 is analyzed to detect the vibration level of the obtained vibration spectrum so as to estimate the condition of the road and the road friction coefficient μ. The condition of the road and the road friction coefficient μ may be estimated by detecting a change in the pressure of a gas filled in each tire of a running car.

Figure 11:
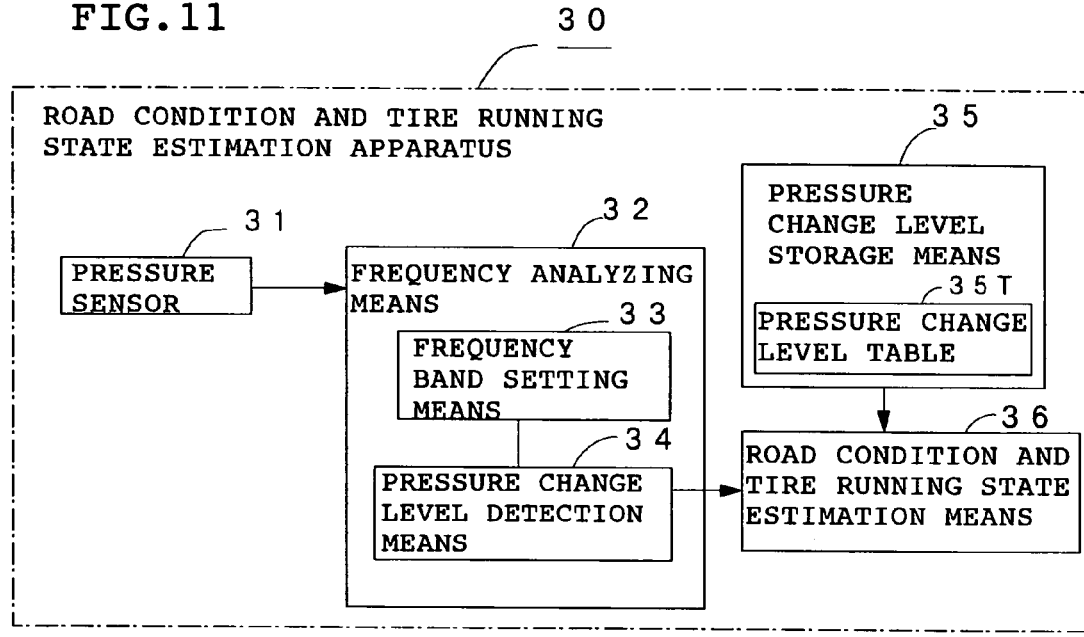
FIG. 11 is a block diagram showing the constitution of still another car control apparatus according to the present invention.

FIG. 11 is a block diagram of a road condition and tire running state estimation apparatus 30 according to this Embodiment 4. In FIG. 11, reference numeral 31 denotes a pressure sensor as pressure change detection means provided in the tire, 32 frequency analyzing means, having frequency band setting means 33 and pressure change level detection means 34, for analyzing the frequency of a microvibration component (AC component) on the time axis of the output of the pressure sensor 31 which is a signal indicative of a change in the pressure of the gas filled in the tire detected by the above pressure sensor 31 to detect a vibration level at a frequency band included in a frequency range at which the vibration level is characteristically changed by the condition of the road and the running state of the tire of the frequency spectrum of the above pressure change (to be referred to as "pressure change spectrum" hereinafter), that is, at least 10 to 10,000 Hz, 35 pressure change level storage means for storing a pressure change level table 35T showing the relationship between the condition of the road or the running state of the tire and a pressure change level at a predetermined frequency band (to be referred to as "frequency band value of a pressure change" hereinafter) which is obtained in advance, and 36 road condition and tire running state estimation means for estimating the condition of the road and the running state of the tire by comparing the pressure change level detected by the above frequency analyzing means 32 with the above pressure change level table 35T.

The above pressure change level table 35T is prepared by mounting the pressure sensor 31 on a test car, causing the car to run over different roads which differ in condition (road friction coefficient μ) at a predetermined speed V or causing a car equipped with a trially manufactured tire corresponding to a trouble tire part of whose tread has been peeled off to run, and actually measuring a change in the pressure of a gas in the tire.

Figure 12A:
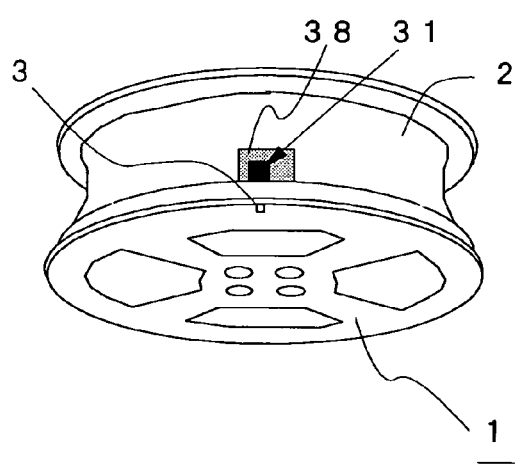
FIGS. 12(A) and 12(B) are diagrams showing the mounting position of a pressure sensor.
Figure 12B:
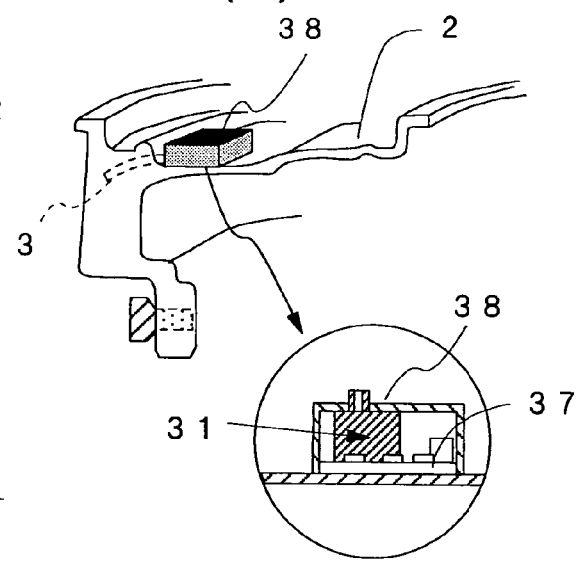
Figure 13:
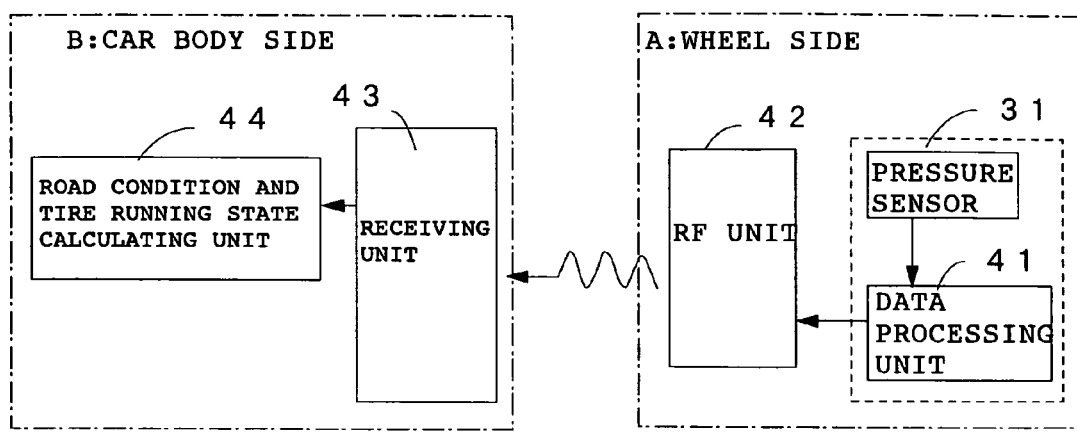
FIG. 13 is a block diagram showing an example of constitution for transmitting a pressure change information signal to a car body side.

In this embodiment, as shown in FIGS. 12(A) and 12(B), the above pressure sensor 31 is mounted on a substrate 37 which mounts circuit parts including a detection circuit and stored in a sensor box 38 mounted on the depressed portion on the tire side of the wheel rim 2 of the wheel 1, and the wheel side (rolling side) A and the car body side B which is not rolling are interconnected by radio as shown in FIG. 13.

On the wheel side A, there are provided the above pressure sensor 31, a data processing unit 41 for converting a signal indicative of a change in the pressure of the gas filled in the tire detected by the pressure sensor 31 into a digital signal and compressing the digital signal, and an RF (Radio Frequency) unit 42 for transmitting this compressed signal to the car body side B by radio. On the car body side B, there are provided a receiving unit 43 for receiving the above compressed signal, and a road condition and tire running state calculating unit 44 for restoring the received compressed signal to its original state to analyze its frequency and estimating the condition of the road and the running state of the tire from the obtained pressure change spectrum. The road condition and tire running state calculating unit 44 is composed of the frequency analyzing means 32, the pressure change level storage means 35 and the road condition and tire running state estimating means 36 shown in FIG. 11. Thereby, the condition of the road and the running state of the tire can be estimated by processing on the car body side B the pressure change signal detected on the rolling wheel side without providing a signal connection line.

A description is subsequently given of the operation of the above road condition and tire running state estimation apparatus 30 when the estimated value of road friction coefficient μ is to be obtained.

A change in the pressure of the gas filled in the tire at the time of running is first detected by the pressure sensor 31, and the frequency of this change is analyzed by the frequency analyzing means 32 to detect a pressure change level at a predetermined frequency band. Stated more specifically, the above pressure change level detected by the frequency analyzing means 32 is a pressure change level at a frequency band having a predetermined bandwidth whose center frequency is in a frequency range at which its vibration level is characteristically changed by the condition of the road and the running state of the tire, that is, at least 10 to 10,000 Hz. It may be, for example, a pressure change level at one frequency band having a relatively wide bandwidth, for example, 800 to 3,500 Hz, or pressure change levels at a plurality of frequency bands having a relatively narrow bandwidth, for example, 800 to 1,000 Hz, 1,600 to 2,000 Hz and 3,000 to 3,500 Hz. In the frequency analyzing means 32, the above one or plurality of frequency bands are set by the frequency band setting means 33 and a vibration level(s) at the frequency band(s) is/are detected by the vibration level detection means 34.

The above detected vibration level(s) is/are transmitted to the road condition and tire running state estimation means 36 which compares the detected pressure change level(s) at a predetermined frequency band(s) (frequency band value of a pressure change) with the pressure change level table 35T showing the relationship between the road friction coefficient μ and the frequency band value of a pressure change stored in the pressure change level storage means 35 to obtain an estimated value of road friction coefficient (μ estimated value), thereby making it possible to estimate the condition of the road (road friction coefficient μ) accurately.

Not the estimated value of road friction coefficient μ but the condition of the road, for example, the normal condition of a road (dry), the condition of a road which needs attention (wet road, road covered with snow, etc.) or the dangerous condition of a road (hydroplaning, road covered with compressed snow, road having a mirror surface, etc.) may be estimated.

Alternatively, slipperiness which is a condition of the running tire may be estimated from the above road friction coefficient μ.

It is also possible to estimate a trouble with the tire from the above pressure change spectrum. Stated more specifically, when part of the tire tread peels off, a special vibration occurs each time that part contacts the road. Therefore, the occurrence of some trouble in the tire can be estimated by detecting a pressure change level at a frequency band of 10 to 100 Hz of the above pressure change spectrum and comparing it with the pressure change level of a normal tire. That is, since the pressure change level at a frequency band of 10 to 100 Hz is a pressure change level at a frequency band which is synchronous with the revolution of the tire, a trouble with the tire can be estimated by detecting the above pressure change level and comparing it with a pressure change level at the time of normal operation. More specifically, when the above detected pressure change level is 20% or more higher than the pressure change level at the time of normal operation, it is estimated that some trouble occurs in the tire.

The method of setting a frequency band for detecting a pressure change level used to estimate the road friction coefficient μ or the condition of the road by means of the above frequency band setting means 33 is the same as in the above Embodiment 1. The μ estimated value is calculated by taking the frequency band value $x_i$ of a vibration as the frequency band value $x_i$ of a pressure change (pressure change level) in the equation (1) for calculating the estimated value which is given again hereinbelow, the coefficient of correlation between the calculated μ estimated value and the road friction coefficient μ measured in advance is obtained, and frequency bands $f_i$ (i=1 to n) for detecting a pressure change level are set to ensure that this correlation coefficient becomes highest. The number of the above frequency bands $f_i$ is preferably 3 or more.

$$\mu \text{ estimated value} = 1/[1+\exp\{-(a_0+a_1x_1+a_2x_2+\ldots+a_nx_n)\}] \quad (1)$$

wherein $a_0$ is a constant, and $a_1$, $a_2$, . . . and $a_n$ are coefficients. When only the condition of the road or the road friction coefficient μ is to be estimated, it is not necessary to store the relationship between the condition of the road or the running state of the tire and a pressure change level at a predetermined frequency band. Therefore, the pressure change level storage means 35 can be omitted from the above apparatus 30, and the road condition and tire running state estimation means 36 may obtain the μ estimated value directly from the frequency band value $x_i$ of a pressure change detected by the frequency analyzing means 32 based on the above equation (1) or estimate the condition of the road from the above μ estimated value.

Thus, according to this Embodiment 4, the pressure sensor 31 is mounted to the wheel rim 2 of the wheel 1 to detect the pressure of the gas filled in the tire of the running car, the frequency of the micro-vibration component (AC component) on the time axis of the detected pressure signal is analyzed by the frequency analyzing means 32 to detect the pressure change level of the obtained pressure change spectrum, and the detected pressure change level is compared with the pressure change level table 35T showing the relationship with the condition of the road and the running state of the tire stored in the pressure change level storage means 35 so as to estimate the road friction coefficient μ and a trouble with the tire. Therefore, the condition of the road and the running state of the tire can be estimated accurately.

Since the inside pressure of the tire can be detected from the absolute value (DC component) of the output of the pressure sensor 31, a pressure sensor for use in a tire inside pressure monitor system which is now very popular can be used in the apparatus 30 as the above pressure sensor 31 as it is. Accordingly, the cost can be reduced by eliminating an increase in cost due to the addition of hardware.

Since the inside pressure of the tire is detected by the above pressure sensor 31, the abnormal inside pressure of the tire which is one of the running states of the tire can be estimated.

When the above road condition and tire running state estimation apparatus 30 is provided with means for detecting the car speed and the pressure change level table 35T showing the relationship between the road friction coefficient μ and the frequency band value of a pressure change for each car speed to estimate the condition of the road at the time of running and the running state of the tire based on data on the car speed in addition to data on the pressure change spectrum, the estimation accuracy of the condition of the road and the running state of the tire can be further improved.

Further, it is also possible to estimate the condition of the road and the running state of the tire based on data on the load of each wheel by mounting a load measuring instrument to each wheel of the car to detect a load applied to each wheel.

That is, in a large-sized truck in which a load applied to each wheel greatly changes according to the weight of freight, as the friction coefficient greatly changes according to the load, the vibration state of the tire changes according to the load (as the load becomes larger, the friction coefficient decreases but the car hardly slips). To compensate for this, the vibration level table 15T showing the relationship between the road friction coefficient μ and the vibration level is prepared for each load and stored, and the condition of the road and the running state of the tire are estimated based on data on the load of each wheel detected by the load measuring instrument, thereby making it possible to further improve the estimation accuracy.

EXAMPLE 1

Figure 14:
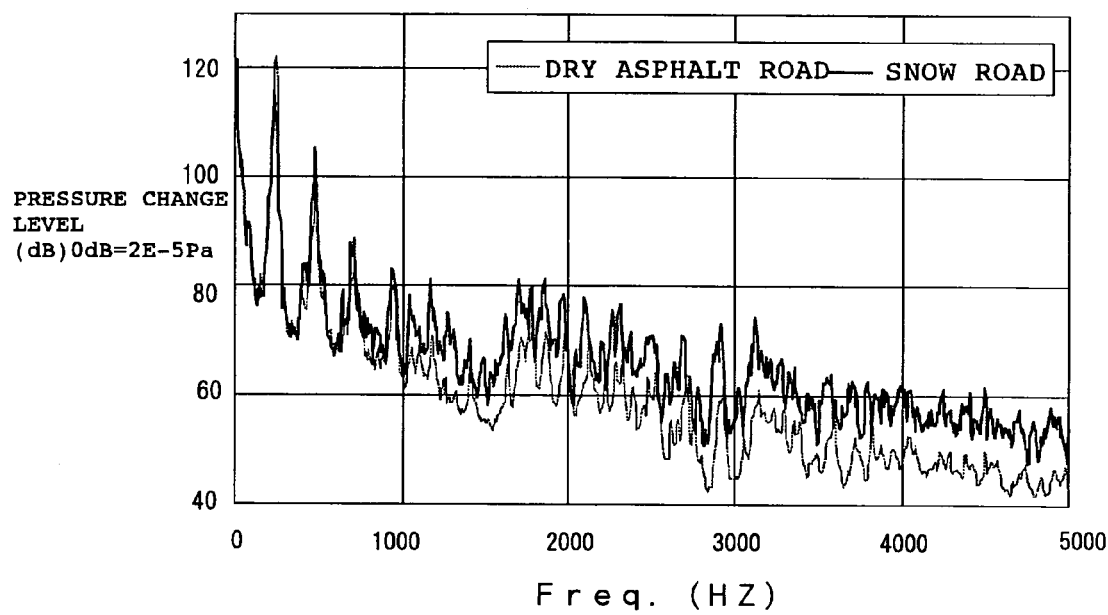
FIG. 14 is a graph showing pressure change spectra obtained when a car equipped with a pressure sensor is caused to run over a dry asphalt road and a snow road.

FIG. 14 shows pressure change spectra obtained by mounting the pressure sensor 11 on a test car, causing the car to run over an ordinary asphalt road (dry asphalt road) and a slippery road covered with snow at V=20 km/h to measure changes in the inside pressure of the tire and analyzing the frequencies of the changes. The frequency is plotted on the horizontal axis of the graph and the size of a pressure change level when $2\times10^{-2}$ Pa is 0 dB is plotted on the vertical axis. The thin solid line in the graph shows data on the dry asphalt road and the bold solid line shows data on the snow road.

It is understood from FIG. 14 that the pressure change level is high at a high frequency range of 1,000 Hz or more on a slippery snow road. This is considered to be because the constraint of the tread surface of the tire in contact with the road from the road becomes small on the slippery snow road and the tread surface generates a slide vibration to oscillate the gas in the tire.

It is thus confirmed that when the relationship between the pressure change level and the road friction coefficient μ is investigated in advance, the condition of the road (road friction coefficient μ) can be estimated by always monitoring a change in the inside pressure of the tire.

This method can be applied to the vibration of a tire, the vibration of a wheel and the vibration of a suspension.

EXAMPLE 2

Figure 15:
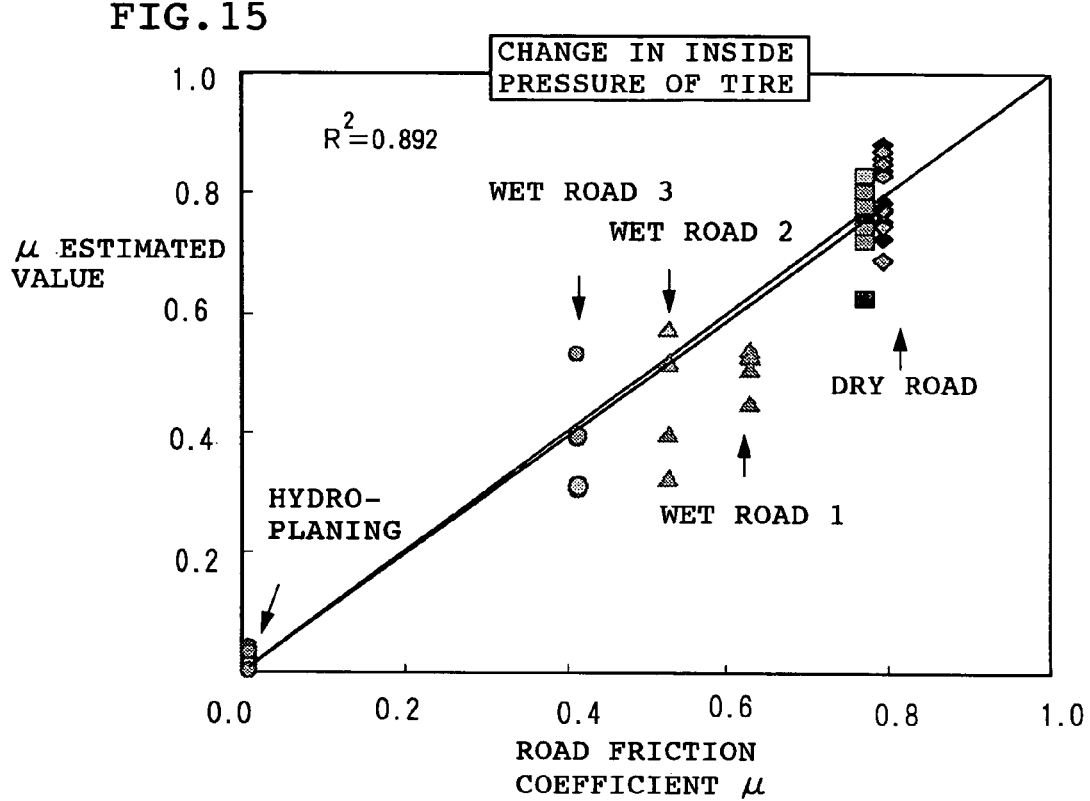
FIG. 15 is a graph showing correlation between the actual road friction coefficient μ and the μ estimated value obtained from a tire inside pressure change.
Figure 16:
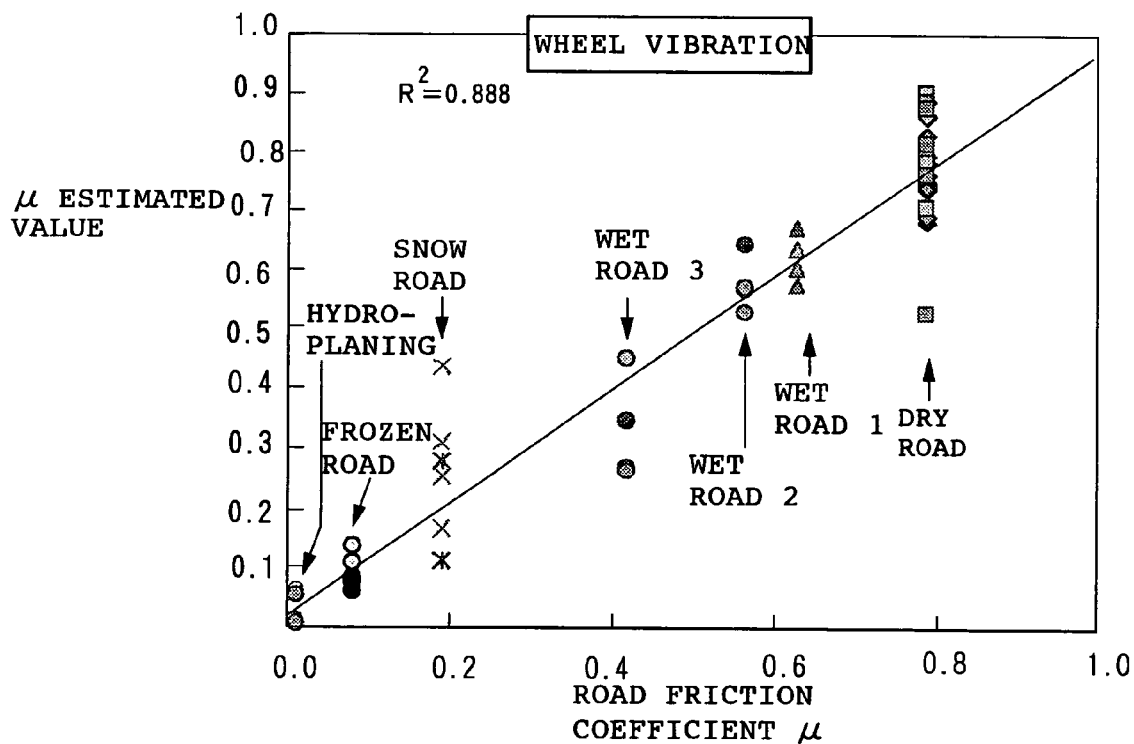
FIG. 16 is a graph showing correlation between the actual road friction coefficient μ and the μ estimated value obtained from the vibration of a wheel.

FIG. 15 and FIG. 16 show the results of correlations between the μ estimated values calculated from the above equation (1) by measuring a change in the inside pressure of a tire and the vibration of a wheel under the various conditions of roads by the same method as in Example 1 and the actually measured road friction coefficient μ, respectively. The vibration level and pressure change level used in the calculation of the μ estimated value are a vibration level and a pressure change level at a frequency band set by the method of the above Embodiment 1, respectively.

In all the cases of a change in the inside pressure of the tire and the vibration of the wheel, it is confirmed that the value of road friction coefficient can be obtained accurately because the μ estimated value shows high correlation with the road friction coefficient μ. The same results were obtained for the vibration of a tire and the vibration of a suspension.

Embodiment 5

In the above Embodiments 1 to 4, the vibration of a tire, the vibration of a wheel, the vibration of a suspension or a change in the inside pressure of a tire is detected to estimate the condition of the road and the running state of the tire. With the above method, a slippery road covered with ice and snow and hydroplaning cannot be clearly distinguished from each other.

The inventors of the present invention have studied the above vibration spectra or the pressure change spectrum in detail and have found that when hydroplaning occurs, the vibration level or pressure change level near the primary frequency of the pattern pitch of the tire becomes large characteristically.

Figure 17:
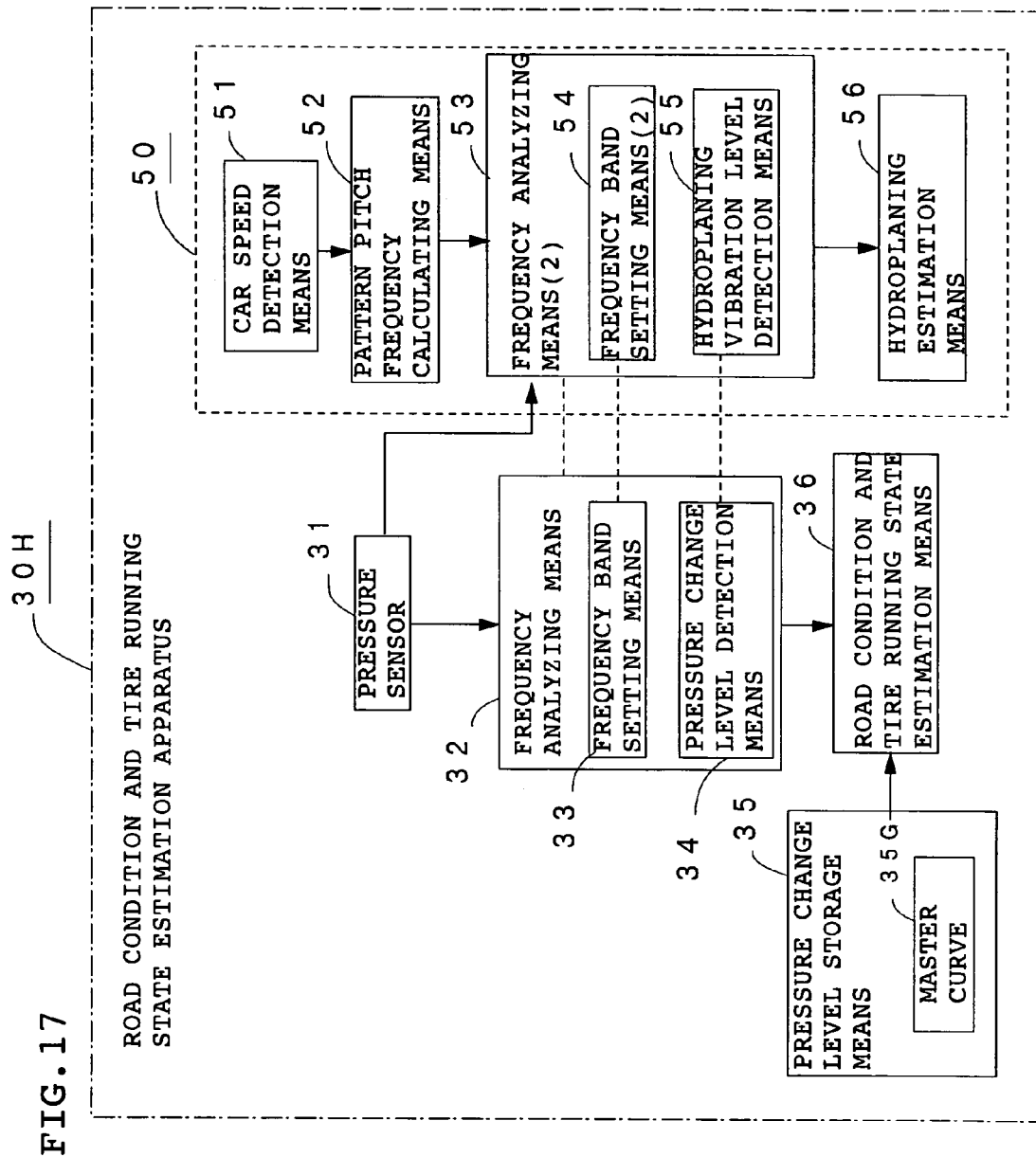
FIG. 17 is a block diagram showing the constitution of hydroplaning estimation means according to Embodiment 5 of the present invention.

In this embodiment, as shown in FIG. 17, a road condition and tire running state estimation apparatus 30H is constructed by adding hydroplaning detection means 50 to the apparatus 30 of the above Embodiment 4 to detect a vibration level or pressure change level near the primary frequency of the pattern pitch of the tire so as to estimate the occurrence of hydroplaning at the same time.

In FIG. 17, reference numeral 51 denotes car speed detecting means for detecting the speed of a car, 52 pattern pitch frequency calculating means for calculating a pattern pitch frequency from data on the car speed from the above car speed detection means 51, and 53 second frequency analyzing means for analyzing the frequency of the output of the pressure sensor 31, which is provided with second frequency band setting means 54 for setting the frequency band for detecting a pressure change level to a frequency band including the above pattern pitch frequency, and hydroplaning vibration level detecting means 55 for detecting a pressure change level at the above set frequency band.

Reference numeral 56 denotes hydroplaning estimation means for estimating the occurrence of hydroplaning by comparing the above detected pressure change level with a predetermined threshold value.

In the above hydroplaning detection means 50, the pattern pitch frequency calculating means 52 calculates a pattern pitch frequency $F_p$ from the car speed data V detected by the car speed detection means 51, the circumferential length L of the tire and the number n of tread pattern blocks based on the following equation (2).

$$F_p(Hz) = V(km/h) \times 1000(m/km) \div 3600(s/h) \div L(m) \times n \quad (2)$$

After a pressure change level at a frequency band corresponding to the above pattern pitch frequency $F_p$ of the pressure change spectrum is detected by the hydroplaning vibration level detection means 55 of the second frequency analyzing means 53, the detected pressure change level and a predetermined threshold value are compared with each other by the hydroplaning estimation means 56. When the above pressure change level exceeds the above threshold value, it is estimated that hydroplaning occurs.

Thereby, a slippery road which is covered with ice and snow and hydroplaning can be clearly distinguished from each other.

When the above threshold value can be suitably changed, for example, by a load applied to each wheel, the estimation accuracy of hydroplaning can be further improved.

In the above Embodiment 5, hydroplaning is estimated by detecting a change in the pressure of the gas in the tire by means of the pressure sensor 31. Hydroplaning can also be estimated from a vibration spectrum obtained by detecting the vibration of a tire, tread or suspension with the acceleration sensor and analyzing the frequency of the vibration.

In the above embodiment, when the pressure change level at the pattern pitch frequency band exceeds a predetermined threshold value, it is estimated that the tire is hydroplaning. When a vibration level or pressure change level at a frequency band which is not affected by the above pattern pitch frequency is obtained and the ratio of the vibration level or the pressure change level at the pattern pitch frequency band to the above vibration level or pressure change level exceeds a predetermined threshold value, it is estimated that the tire is hydroplaning. Thereby, the estimation accuracy of hydroplaning can be further improved.

The function of the above second frequency analyzing means 53 may be provided to the above frequency analyzing means 32 as well.

EXAMPLE 3

A pressure sensor was mounted on a test car, and the test car was caused to run on a road having a water depth of 10 mm at V=90 km/h. Hydroplaning occurred and the car got into a dangerous condition that the control of the car body by the operation of the steering handle or brake was impossible.

Figure 18:
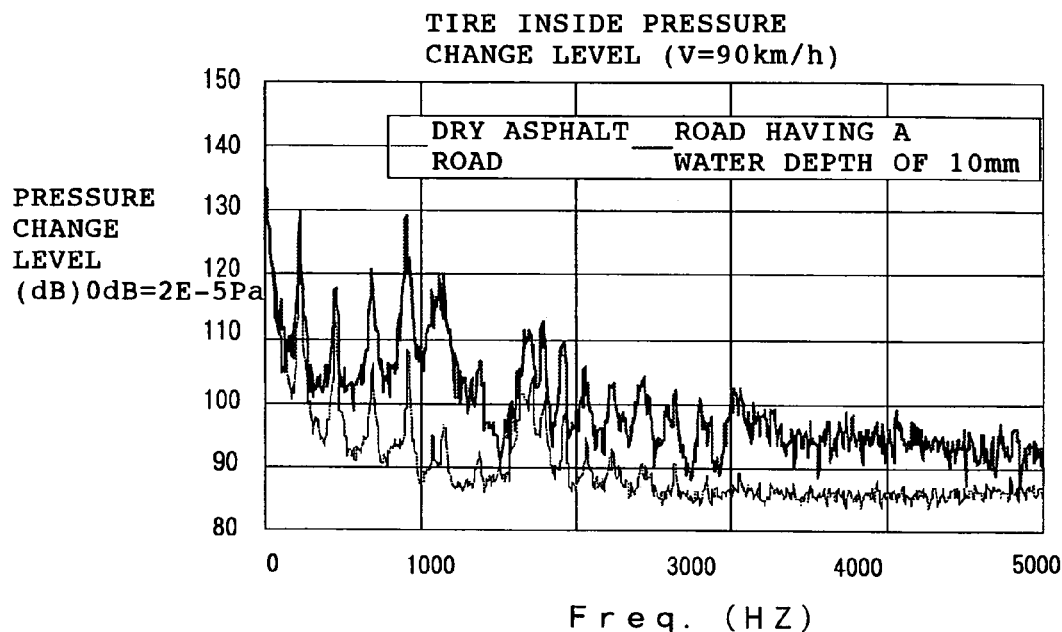
FIG. 18 is a graph showing the pressure change spectra of hydroplaning.

When a change in the inside pressure of the tire under the above condition was measured and the frequency of the change was analyzed to obtain a pressure change spectrum, as shown in FIG. 18, it was found that the vibration level at a frequency band of 900 to 1,000 Hz was characteristically high.

Figure 19:
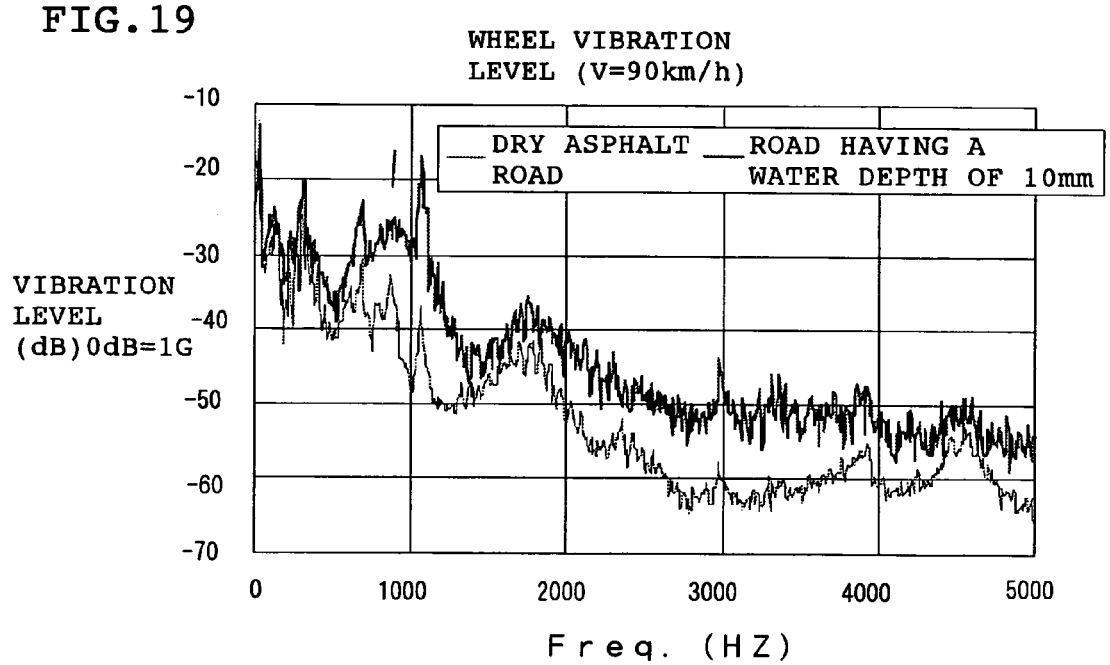
FIG. 19 is a graph showing the vibration spectra of hydroplaning.

When a similar experiment was conducted by mounting an acceleration sensor to the test car to obtain a vibration spectrum, as shown in FIG. 19, the peak of the vibration level was seen at the same frequency band as in FIG. 18.

The tire used in the above test car was a tire for passenger cars having the 195/60R15 size and its pitch frequency can be calculated from the above equation (2) as follows.

$$90(km/h) \times 1000(m/km) \div 3600(s/h) \div 1.885(m) \times 70 = 943 \, Hz$$

That is, it is understood that the pressure change level and the vibration level are high at a frequency band of 900 to 1,000 Hz of the pressure change spectrum shown in FIG. 18 and the vibration spectrum shown in FIG. 19 because a water film between the tire tread and the road collides with the tread block to increase the pressure change and the vibration at the pitch primary frequency of the block. Thereby, it is confirmed that hydroplaning can be estimated by detecting a change in the inside pressure of the tire or the vibration of the tire, wheel or suspension showing the above behavior.

EXAMPLE 4

Figure 20:
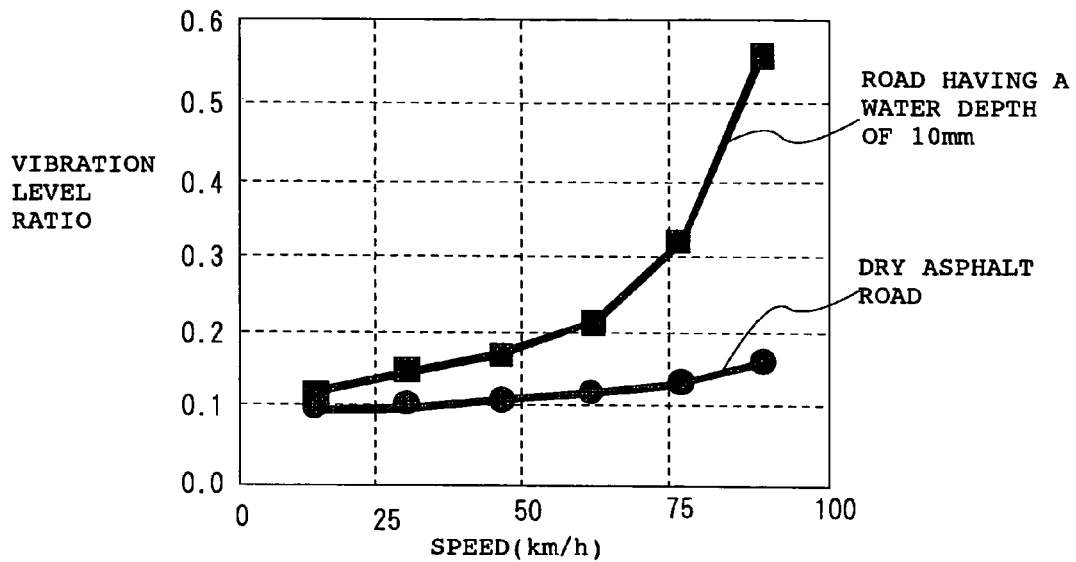
FIG. 20 is a graph showing the relationship between car speed and the ratio of a vibration level at a pattern pitch frequency to a vibration level at a frequency band of 100 to 200 Hz.

FIG. 20 shows the ratio of vibration levels at the following two frequency bands which is calculated by causing a test car equipped with an acceleration sensor on each wheel to run over a road having a water depth of 10 mm and a dry asphalt road at different speeds to obtain vibration spectra.

(vibration level at a frequency band of 900 to 1,000 Hz)/(vibration level at a frequency band of 100 to 200 Hz)

In the case of running over the road having a water depth of 10 mm, it was found that when the car speed exceeds 75 km/h, the ratio of the vibration levels sharply increases. Then, by setting the threshold value to 0.3, hydroplaning can be estimated without fail.

Embodiment 6

In the above Embodiments 1 to 5, the method of estimating a road friction efficient μ at the time of running straight at a constant speed, gentle acceleration or deceleration, or steering is described. When a slip of the tire over the road is extremely large, for example, the slip ratio which is the ratio of the speed of the tire to the speed of the car body becomes high when the speed is accelerated or the brake is stepped on, the estimated value of road friction coefficient tends to become smaller than the actual value. Therefore, when the slip is large, the condition of the road and the degree of danger might be judged wrong. To cope with this, in this embodiment, as shown in FIG. 21, a road condition estimation apparatus 60 provided with μ estimated value output means 62 for updating the μ estimated value based on a control signal from brake switch ON/OFF detection means 61 and outputting the updated signal to car control means 70 for controlling the running condition of the car is constructed as the apparatus 10 of the above Embodiment 1 so that the μ estimated value is detected right before drastic acceleration or deceleration to carry out the appropriate control of the car from the beginning using this μ estimated value in order to prevent the system from malfunctioning by the above slip.

Figure 21:
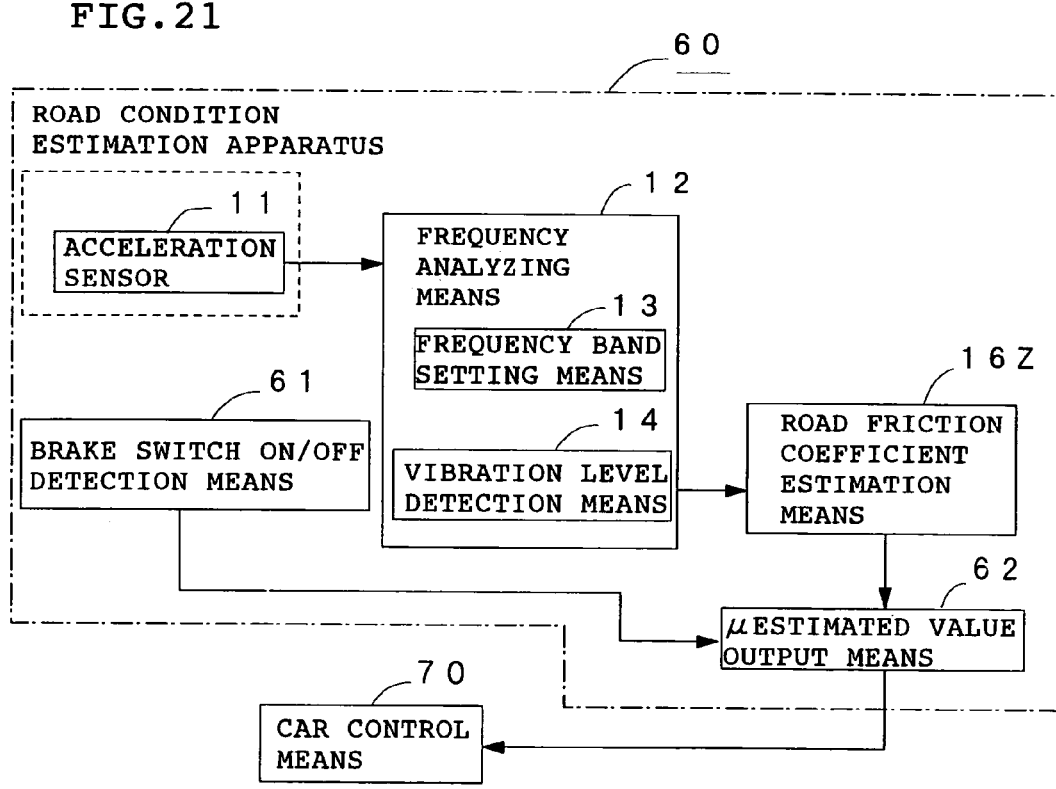
FIG. 21 is a block diagram showing the constitution of a road condition estimation apparatus according to Embodiment 6 of the present invention.

In FIG. 21, reference numeral 11 denotes an acceleration sensor for detecting the vibration of a tire, 12 frequency analyzing means for analyzing the frequency of a vibration information signal indicative of the vibration of a wheel detected by the above acceleration sensor 11 to detect a vibration level at a frequency band included in a frequency range at which the vibration level is characteristically changed by the condition of the road or the running state of the tire, that is, at least 10 to 10,000 Hz, of the frequency spectrum of the above vibration (to be referred to as "vibration spectrum" hereinafter), 16Z road friction coefficient estimation means for calculating the estimated value of road friction coefficient (μ estimated value) from data on the above vibration level based on the equation (1) for calculating the μ estimated value, 61 brake switch ON/OFF detection means for detecting the ON/OFF state of a brake switch, and 62 μ estimated value output means for updating the calculated μ estimated value based on a control signal from the above brake switch ON/OFF detection means 61 and outputting it to car control means 70 for controlling the running condition of the car.

In this Embodiment, the above acceleration sensor 11 is mounted on the depressed portion on the tire side of the wheel rim 2 of the wheel 1 as in the above Embodiment 1 to detect the vibration of the wheel 1 transmitted from the tire 4.

A description is subsequently given of the operation of the above road condition estimation apparatus 60.

A vibration transmitted to the wheel 1 from the tire is detected by the acceleration sensor 11, and the frequency of the detected vibration information signal is analyzed by the frequency analyzing means 12 to detect a vibration level at a predetermined frequency band. Stated more specifically, the above vibration level detected by the frequency analyzing means 12 is a vibration level at a frequency band having a predetermined bandwidth whose center frequency is in a range at which the vibration level is characteristically changed by the condition of the road and the running state of the tire, that is, at least 10 to 10,000 Hz. It may be a vibration level at one frequency band having a relatively wide bandwidth, for example, 800 to 3,500 Hz, or vibration levels at a plurality of frequency bands having a relatively narrow bandwidth, for example, 800 to 1,000 Hz, 1,600 to 2,000 Hz and 3,000 to 3,500 Hz. In the frequency analyzing means 12, the frequency band setting means 13 sets the above one or plurality of frequency bands $f_i$ (i=1 to n), and the vibration level detection means 14 detects the vibration level(s) at the frequency band(s), that is, the frequency band value(s) $x_i$ (i=1 to n) of the vibration.

The detection of the above frequency band value(s) $x_i$ of the vibration by the frequency analyzing means 12 having the frequency band setting means 13 and the vibration level detection means 14 can be generally realized by an FFT analyzer which is a frequency analyzer making use of high-speed Fourier transformation (FFT).

The road friction coefficient estimation means 16Z calculates a μ estimated value from the above detected vibration frequency band value(s) $x_i$ based on the equation (1) for calculating the μ estimated value which is given below again.

$$\mu \text{ estimated value}=1/[1+\exp\{-(a_0+a_1x_1+a_2x_2+\ldots+a_nx_n)\}] \quad (1)$$

wherein $a_0$ is a constant, and $a_1$, $a_2$, . . . and $a_n$ are coefficients.

The coefficient of correlation between the μ estimated value calculated from the above equation (1) and the road friction coefficient obtained in advance is obtained, and the plurality of frequency bands $f_i$ (i=1 to n) for calculating the above μ estimated value are set to ensure that this correlation coefficient becomes highest.

The above road friction coefficient estimation means 16Z calculates the μ estimated value from the vibration level(s) $x_i$ (i=1 to n) at frequency band(s) $f_i$ (i=1 to n) set by the above method and detected by the vibration level detection means 14 of the frequency analyzing means 12 based on the above equation (1).

The μ estimated value calculated by the above road friction coefficient estimation means 16Z is supplied to the μ estimated value output means 62. The μ estimated value output means 62 updates the μ estimated value with a μ estimated value transmitted from the above road friction coefficient estimation means 16Z when an updating suspension signal is not input from the brake switch ON/OFF detection means 16 and outputs the updated μ estimated value to the car control means 70. When the above updating suspension signal is input, the μ estimated value is not updated and the μ estimated value before the brake is stepped on is output to the car control means 70.

Figure 22:
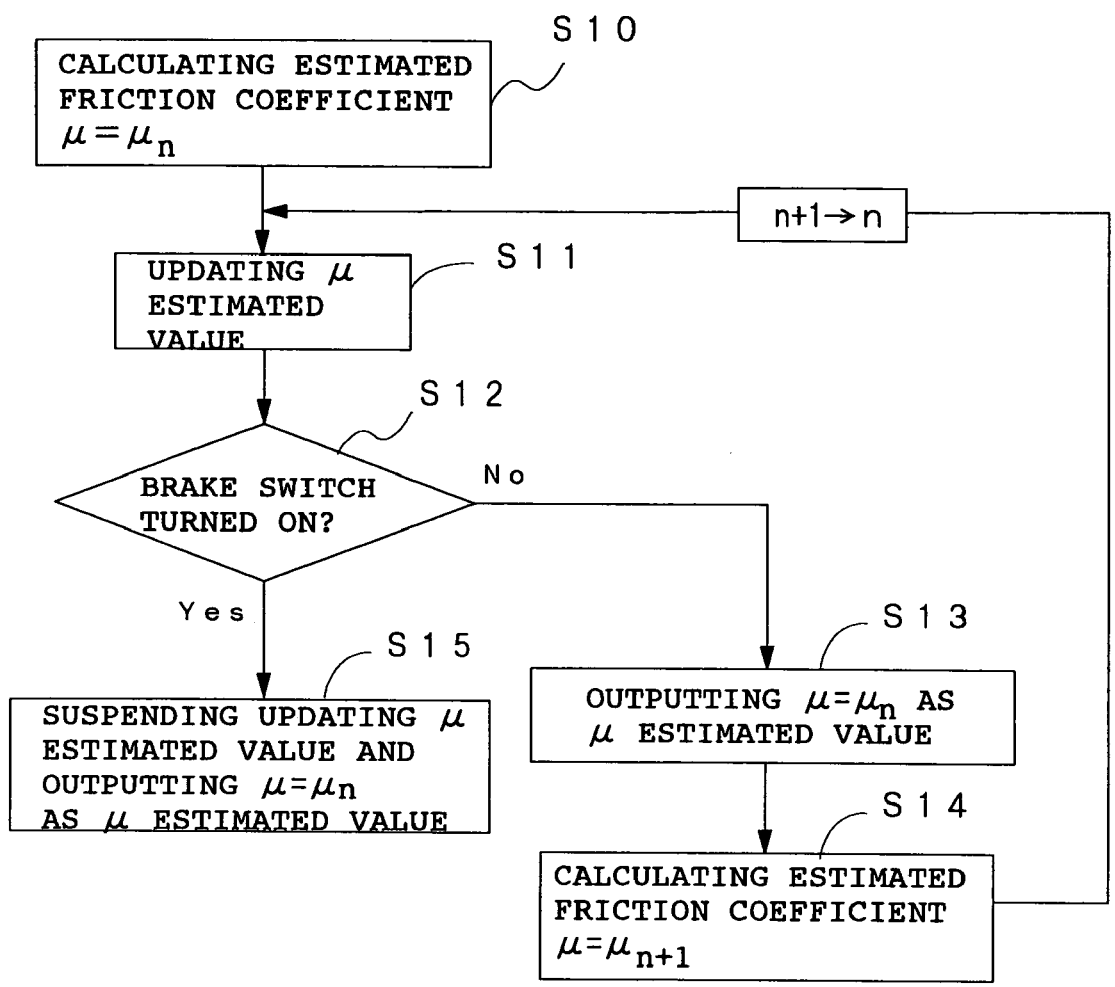
FIG. 22 is a flow chart for the control of updating the μ estimated value by the detection of a brake switch.

The method of updating the above μ estimated value will be described in more detail with reference to the flow chart of FIG. 22.

In step S10, the μ estimated value $\mu_n$ is calculated and in step S11, the μ estimated value is updated to the above $\mu_n$. In step S12, the state of the brake switch is detected by the brake switch ON/OFF detection means 61. When the brake switch is at OFF, the routine proceeds to step S13 in which the above $\mu_n$ is output to the car control means 70 as the μ estimated value by the μ estimated value output means 62. In step S14, the next μ estimated value $\mu_{n+1}$ is calculated, the routine returns to the above step S11 with this $\mu_{n+1}$ as $\mu_n$ to update the μ estimated value to $\mu_n$ ($\mu_{n+1}$ calculated in step S14), and the routine proceeds to step S12 to detect the ON/OFF state of the brake switch again.

Meanwhile, when the brake switch is at ON, the routine proceeds to step S15 to output an updating suspension signal to the μ estimated value output means 62 from the brake switch ON/OFF detection means 61 in order to suspend updating the μ estimated value, and then the μ estimated value $\mu_n$ before updating is suspended is output to the car control means 70 as the μ estimated value.

When the OFF state of the brake switch is detected afterwards, the routine returns to the above step S11 after the passage of a predetermined time to resume updating the μ estimated value.

Thus, as the tire easily slips when sharp deceleration occurs by stepping on the brake, control after the brake is stepped on is carried out by using the μ estimated value $\mu_n$ right before the brake is stepped on and not the new μ estimated value $\mu_{n+1}$, thereby making it possible to prevent the system from malfunctioning.

According to the above Embodiment 6, the vibration of the wheel 1 is detected by the acceleration sensor 1, the vibration level of a vibration spectrum obtained by analyzing the frequency of the detected vibration is detected to estimate a road friction coefficient, the ON/OFF state of the brake switch is detected by the brake switch ON/OFF detection means 61, and when it is judged that the brake is stepped on, the updating of the estimated value of road friction coefficient is suspended, thereby making it possible to prevent the system from malfunctioning.

In the above Embodiment 6, the acceleration sensor 11 is mounted on the tire side of the wheel rim 2 to detect the vibration of the tire transmitted to the wheel 1. As described above, the acceleration sensor 11 may be mounted on the wheel disk side of the wheel rim 2, the inner side 5a of the tire tread 5 or the suspension 6 to detect the vibration of the tire so as to estimate the condition of the road.

Alternatively, like the above Embodiment 4, the pressure sensor 31 may be installed in the tire in place of the acceleration sensor 11 to extract a micro-vibration component (AC component) on the time axis of the output of the pressure sensor 31 so as to detect a change in the pressure of the gas filled in the tire, and the pressure change level of a pressure change spectrum obtained by analyzing the frequency of the detected pressure change may be detected to calculate the μ estimated value from this pressure change level based on the above equation (1) for calculating a μ estimated value.

Figure 23:
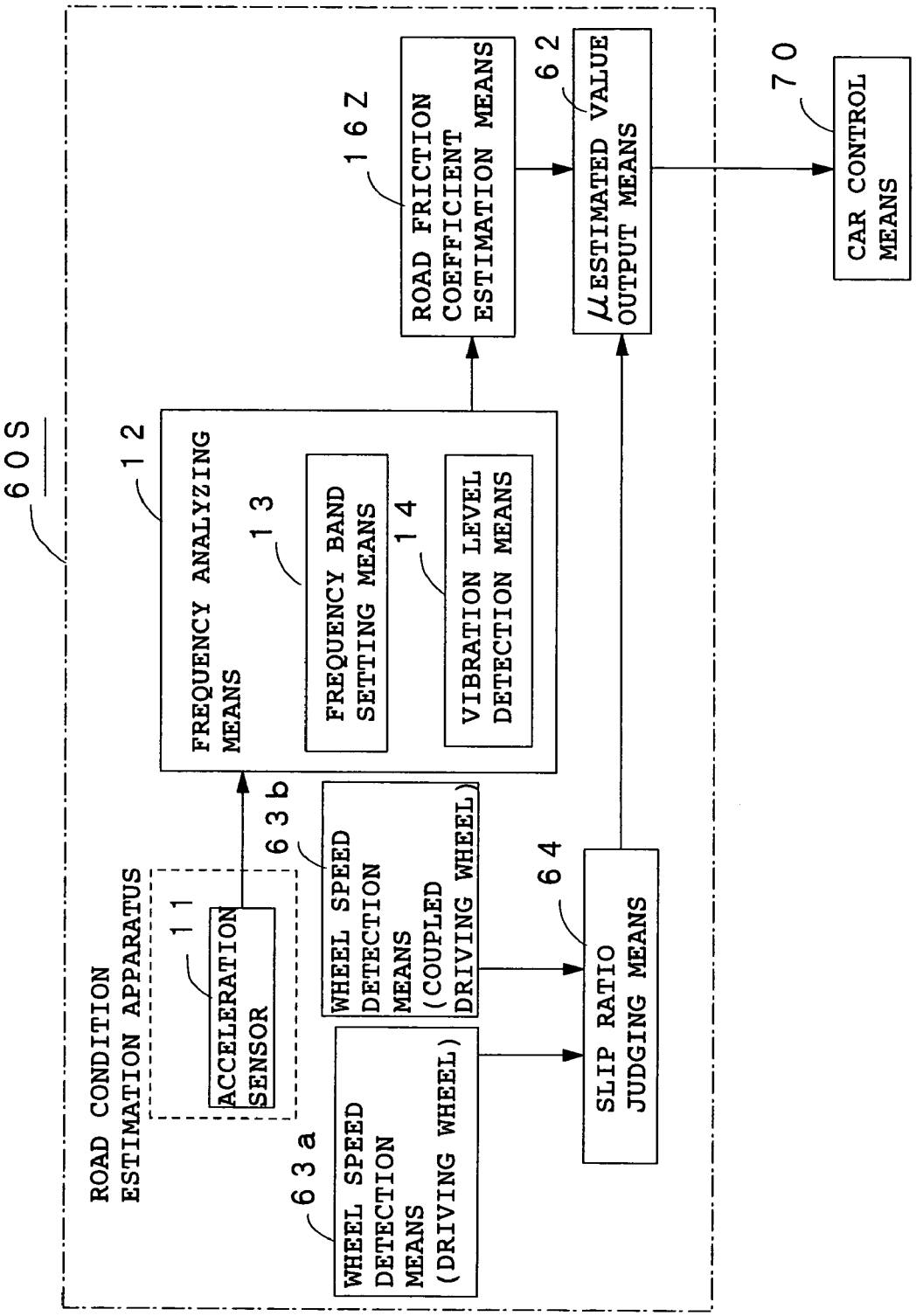
FIG. 23 is a block diagram showing the constitution of a road condition estimation apparatus comprising slip ratio judging means according to the present invention.

In the above Embodiment 6, the updating of the μ estimated value by the μ estimated value output means 62 is controlled by detecting the ON/OFF state of the brake switch. As shown in FIG. 23, a road condition estimation apparatus 60S which comprises wheel speed detection means 63a and 63b for detecting the revolution of a driving wheel and that of a coupled driving wheel and slip ratio judging means 64 for calculating the slip ratio S from the detected revolutions of the driving wheel and the coupled driving wheel and judging the size of the slip ratio S by comparing it with a predetermined threshold value K in place of or addition to the above brake switch ON/OFF detection means 61 may be constructed to control the updating of the μ estimated value based on the size of the slip ratio S.

The method of updating the μ estimated value based on the above slip ratio S will be described in detail with reference to the flow chart of FIG. 24.

In step S20, the μ estimated value $\mu_n$ is calculated and in step S21, the μ estimated value is updated to the new μ estimated value $\mu_n$. In step S22, the revolution F1 of the driving wheel and the revolution F2 of the coupled driving wheel are detected and in step S23, the slip ratio S is calculated from the following equation (2).

$$S=|(a \cdot F1 - b \cdot F2)/(a \cdot F2)| \qquad (2)$$

F1 and F2 are the average values of the respective two wheels, and "a" and "b" are coefficients for converting a revolution into a speed.

In step S24, whether the above slip ratio S exceeds the preset threshold value K (K=0.2) is judged.

When $S \leq K$, the routine proceeds to step S25 in which the μ estimated value output means 62 outputs the above $\mu_n$ as the μ estimated value to the car control means 70. In step S26, the next μ estimated value $\mu_{n+1}$ is calculated, the routine returns to the above step S21 with this $\mu_{n+1}$ as $\mu_n$ to update the μ estimated value to the above $\mu_n$ ($\mu_{n+1}$ calculated in step S26) and then to the step S22.

When S>K, the routine proceeds to step S27 to output an updating suspension signal from the slip ratio judging means 64 to the μ estimated value output means 62 to suspend updating the μ estimated value. Thereafter, $\mu_n$, which is the μ estimated value before the updating is suspended is output as the μ estimated value to the car control means 70.

When the slip ratio S becomes the threshold value K or less, the routine returns to the above step S21 after the passage of a predetermined time to resume updating the μ estimated value.

Control after the slip ratio S of the tire exceeds the preset threshold value K due to sharp acceleration or deceleration is carried out with not the new μ estimated value $\mu_{n+1}$ but the μ estimated value $\mu_n$ which was estimated right before S>K, thereby making it possible to prevent the system from malfunctioning.

In the case of a four wheel-drive car, the method of calculating the slip ratio S from the revolutions of the driving wheel and the coupled driving wheel cannot be employed. Therefore, the engine speed R is detected and when the engine speed becomes higher than a predetermined threshold value $R_z$, it is judged that the torque becomes extremely high and the tire becomes slippery and accordingly, the updating of the μ estimated value is suspended.

The method of updating the μ estimated value with the above engine speed will be described in detail with reference to the flow chart of FIG. 25.

First, in step S30, the μ estimated value $\mu_n$ is calculated and in step S31, the μ estimated value is updated to the above $\mu_n$. In step S32, the engine speed R is detected and whether the detected engine speed R exceeds a predetermined threshold value $R_z$ (for example, $R_z$=4,500 rpm) is judged.

When $R \leq R_z$, the routine proceeds to step S33 in which the μ estimated value output means 62 outputs the above $\mu_n$ as the μ estimated value to the car control means 70. In step S34, the next µ estimated value $\mu_{n+1}$ is calculated, the routine returns to the above step S31 with this $\mu_{n+1}$ as $\mu_n$ to update the µ estimated value to the above $\mu_n$ ($\mu_{n+1}$ calculated in the above step S34), and the routine proceeds to step S32 to detect the engine speed R again.

When R>$R_z$, the routine proceeds to step S35 to suspend updating the µ estimated value. Thereafter, $\mu_n$ which is the µ estimated value before the suspension of updating is output as the µ estimated value to the car control means 70.

Thereafter, when the engine speed becomes $R_z$ or less, the routine returns to the above step S31 after the passage of a predetermined time to resume updating the µ estimated value.

Thereby, even in the case of a four-wheel drive car, the slippery state of the tire is judged by detecting the engine speed R to control the updating of the µ estimated value, thereby making it possible to prevent the system from malfunctioning.

Figure 26:
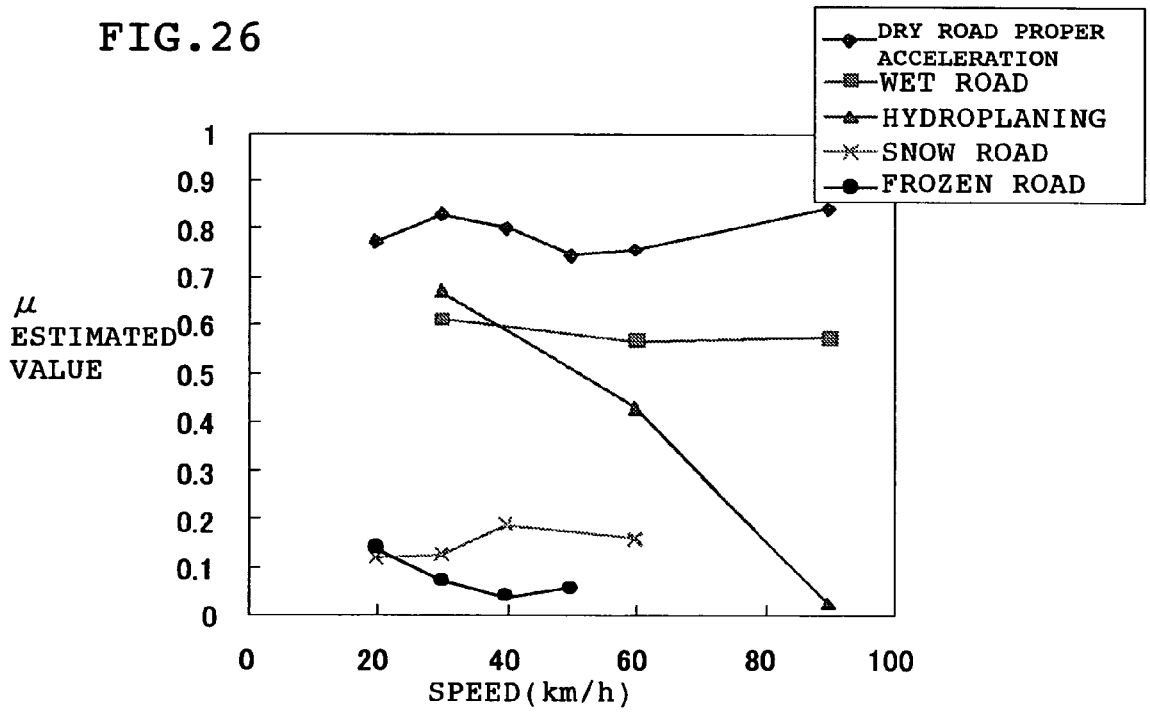
FIG. 26 is a graph showing the calculation results of the μ estimated value when a test car is caused to run over various roads at a constant speed.

FIG. 26 shows the calculation results of the µ estimated values obtained by using the vibration levels at the above optimum frequency bands when the above test car was caused to run over a dry asphalt road, wet asphalt road (water depth of about 1 mm), pool for carrying out a hydroplaning test (concrete; water depth of about 10 mm), road covered with compressed snow and frozen road at a constant speed. In the pool for carrying out a hydroplaning test, as the car speed increases, a tire floating phenomenon occurs and the ground contact area decreases with the result of reduced µ. It is confirmed that this µ estimated value reflects a reduction in µ and is almost the same as a road friction coefficient obtained from the normal stopping distance.

Figure 27:
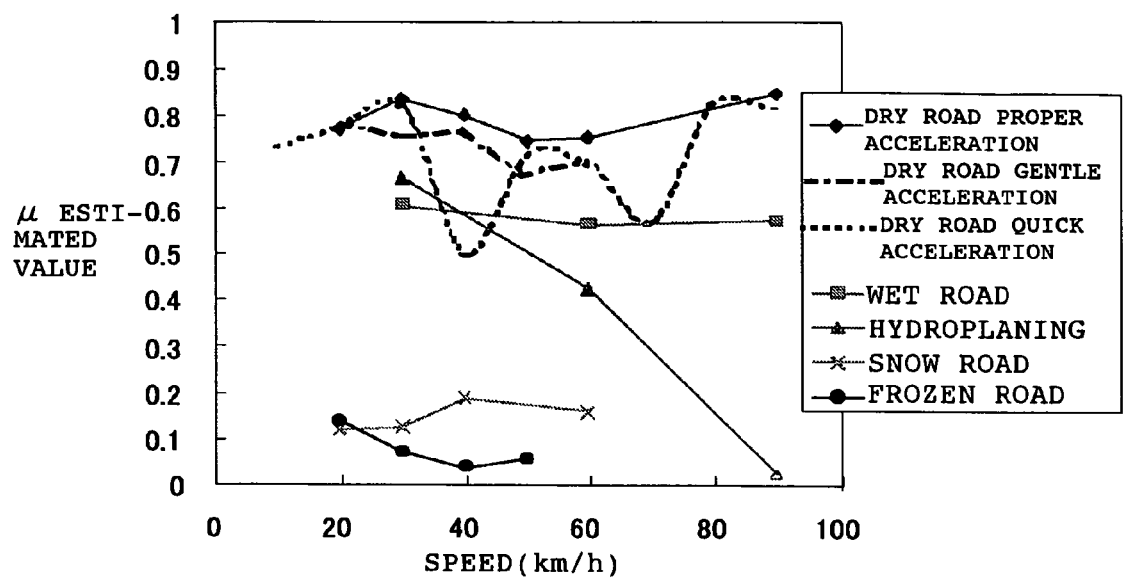
FIG. 27 shows calculation results of the μ estimated values obtained where a test car is accelerated on dry road.

When the above test car was gently accelerated on a dry asphalt road, as shown by the one-dot chain line of FIG. 27, the µ estimated value was almost the same as the µ estimated value when the car was caused to run at a constant speed shown in FIG. 26. It is thus confirmed that the wrong decision of the µ estimated value does not occur.

However, when the above test car was accelerated to the full on a dry asphalt road, as shown by the broken line of FIG. 27, there are areas where the µ estimated value drops. These areas appear right before the engine speed becomes high and the gear change is carried out. That is, they are areas where the engine torque is high and the slip ratio of the tire is high. Actually, the slip ratio of the tire exceeded 20% in fact.

Figure 24:
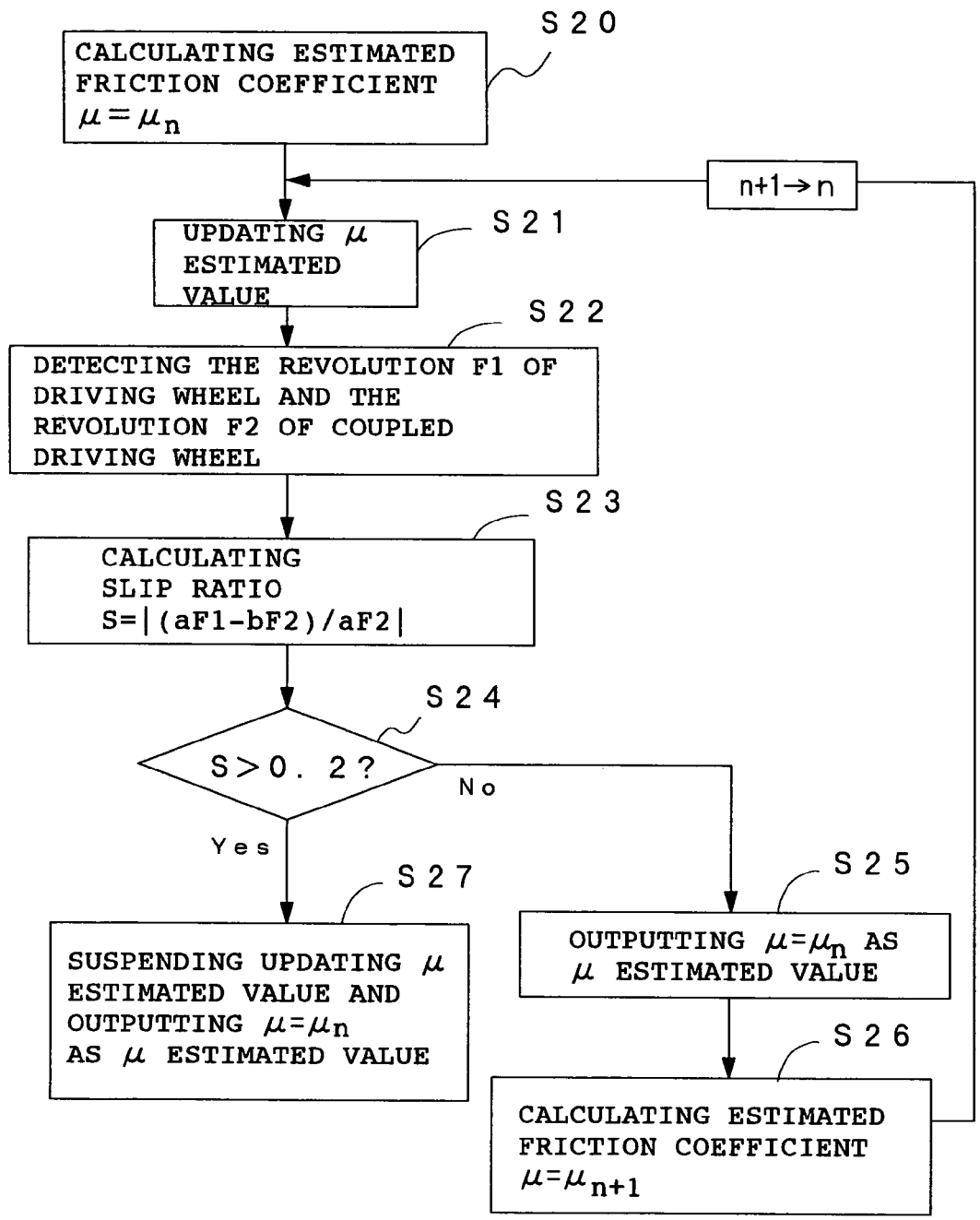
FIG. 24 is a flow chart for the control of updating the μ estimated value with slip ratio.
Figure 25:
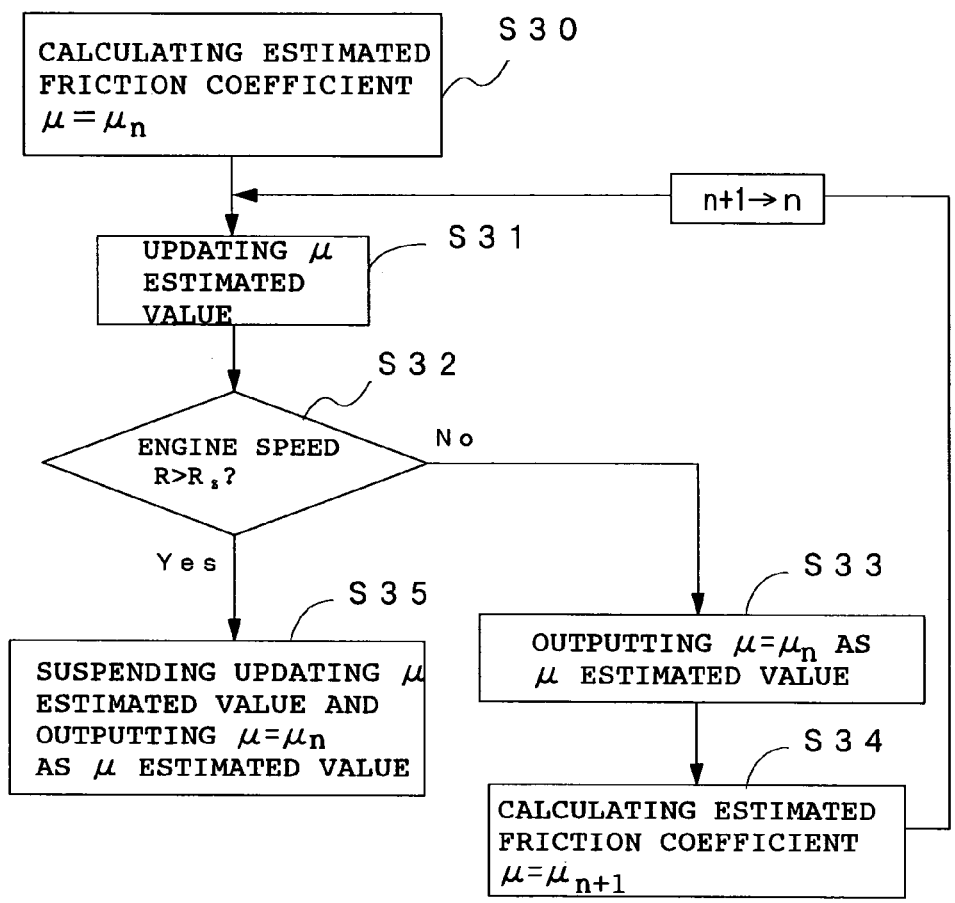
FIG. 25 is a flow chart for the control of updating the μ estimated value with engine speed.
Figure 28:
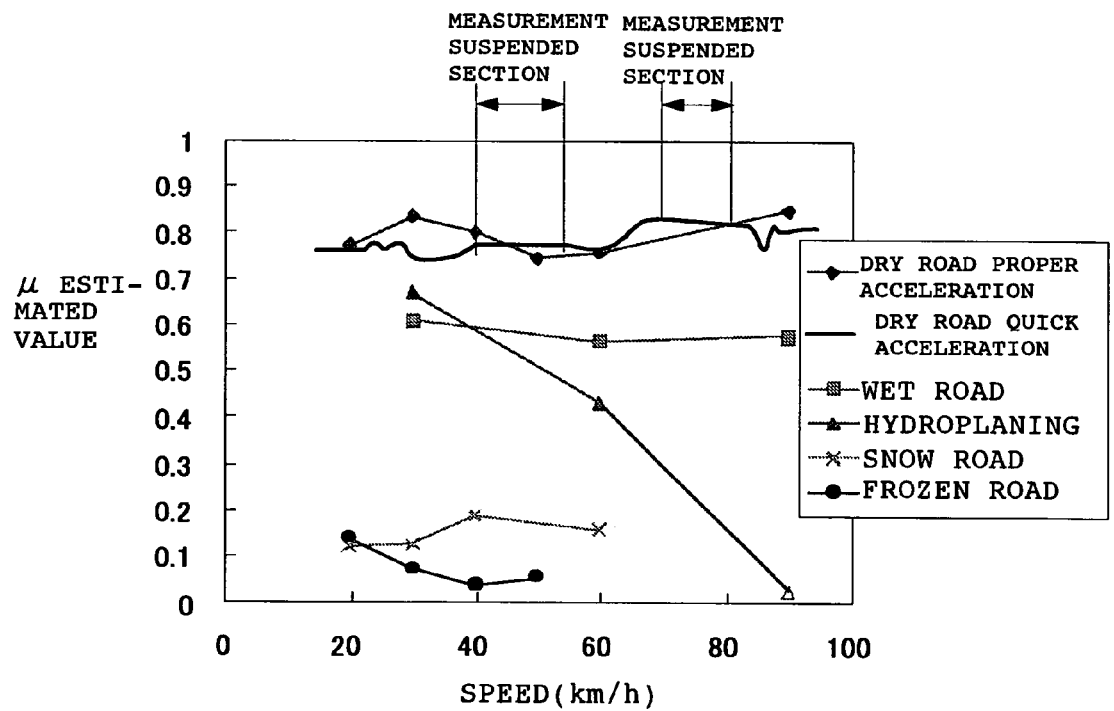
FIG. 28 is a graph showing the calculation results of the μ estimated value when the control of updating the μ estimated value is carried out with slip rate and engine speed.

When a system incorporating the logics of a control flow by the slip ratio S shown in FIG. 24 and a control flow by the engine speed shown in FIG. 25 was mounted on the test car and the test car was accelerated to the full on a dry asphalt road to obtain a µ estimated value, as shown in FIG. 28, it was confirmed that while the slip ratio of the tire was high, the updating of µ was suspended and the previous µ value was retained.

A 1800 cc FF drive car was used as the above test car, the threshold value K of the slip ratio S was set to 0.2, and the threshold value $R_z$ of the engine speed R was set to 4,500 rpm.

Embodiment 7

Figure 29:
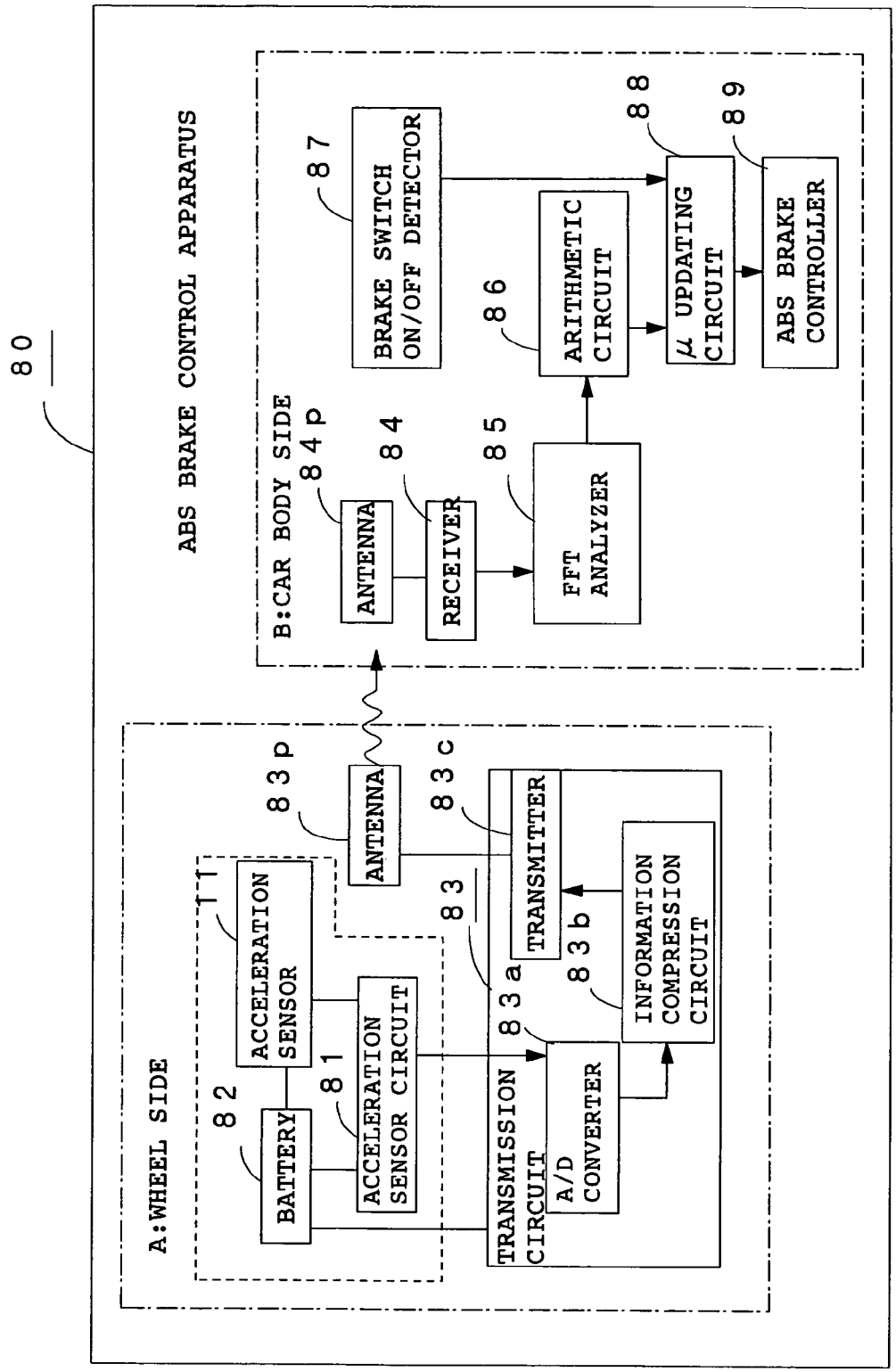
FIG. 29 is a block diagram showing the constitution of an ABS brake control apparatus according to Embodiment 7 of the present invention.

FIG. 29 shows the constitution of an ABS brake control apparatus 80 for controlling an ABS brake by using the calculated µ estimated value, having the means 11 to 14 and 16Z of the road condition estimation apparatus 60 of the above Embodiment 6. In the apparatus 80, the wheel side (rolling side) A on which the acceleration sensor 11 is mounted and the car body side B which is not rolling are interconnected by radio, and an information signal indicative of the vibration of the wheel 1 detected by the acceleration sensor 11 is transmitted by radio to the car body side B where the frequency of the information signal is analyzed to obtain a µ estimated value so as to control the ABS brake therewith.

On the wheel side A, there are provided the acceleration sensor 11, a circuit 81 for driving and detecting the acceleration sensor 11, a battery 82, a transmission circuit 83 which comprises an A/D converter 83*a* for converting the above information signal indicative of the vibration of the wheel 1 detected by the acceleration sensor 11 into a digital signal, an information compression circuit 83*b* for compressing the digital signal and a transmitter 83*c* for transmitting the above compressed signal to the car body side B by radio, and a transmission antenna 83*p*.

On the car body side B, there are provided a receiver 84 for receiving the above compressed signal, an antenna 84*p*, an FFT analyzer 85 for restoring the received compressed signal to its original state and detecting the vibration level at a predetermined frequency band of a vibration spectrum obtained by analyzing the frequency of the signal, an arithmetic circuit 86 for calculating a µ estimated value by using the above vibration level, a brake switch ON/OFF detector 87 for detecting the ON/OFF state of the brake switch, a µ updating circuit 88 for updating the above µ estimated value based on the output of the brake switch ON/OFF detector 87 and outputting the updated value, and an ABS brake controller 89 for controlling the ABS brake.

The above FFT analyzer 85 corresponds to the frequency analyzing means 12 comprising the frequency band setting means 13 and the vibration level detection means 14 of the above Embodiment 6, the arithmetic circuit 86 corresponds to the road friction coefficient estimation means 16Z, the µ updating circuit 88 corresponds to the µ estimated value output means 62, and the brake switch ON/OFF detector 87 corresponds to the brake switch ON/OFF detection means 61.

Thereby, a vibration information signal detected on the wheel side A which is the rolling side is processed on the car body side B to estimate a road friction coefficient so as to control the ABS brake, without providing a signal connection line.

A description is subsequently given of the operation of the above ABS brake control apparatus 80.

The information signal indicative of the vibration of the wheel 1 detected by the acceleration sensor 11 and output from the acceleration sensor circuit 81 is converted into a digital signal by the A/D converter 83*a*, the digital signal is compressed by the information compression circuit 83*b*, and the compressed signal is transmitted from the transmitter 83*c* to the car body side B through the antenna 83*p* by radio.

The transmitted compressed signal is received by the receiver 84 through the antenna 84*p* and transmitted to the FFT analyzer 85. The FFT analyzer 85 restores the above compressed reception signal to its original state to detect the vibration frequency band values $x_i$ (i=1 to n) at a plurality of frequency bands $f_i$ (i=1 to n) of a vibration spectrum obtained by analyzing the frequency of the signal. The arithmetic circuit 86 calculates a µ estimated value from the above vibration frequency band values $x_i$ (i=1 to n) in the same manner as in the above Embodiment 6 and sends it to the µ updating circuit 88 which updates the above µ estimated value and outputs the updated value to the ABS brake controller 89. The ABS brake controller 89 controls the ABS brake based on the updated µ estimated value.

Also in this embodiment, the updating of the μ estimated value by the above μ updating circuit 88 is controlled by the brake switch ON/OF detector 87 in the same manner as in the above Embodiment 6 to enable the change of the μ estimated value for the control of the ABS brake.

Therefore, when the brake is not stepped on, the above calculated μ estimated value is applied to the ABS brake controller 89 and when the brake is stepped on, the μ estimated value obtained right before the brake is stepped on is applied.

In general, when the brake is activated on a low-I road, as friction force from the road is small, the wheel speed drops sharply and the slip ratio increases as will be described hereinafter. When the slip ratio rises too high, this causes a reduction in brake force and a sharp reduction in steering force, which is dangerous.

To cope with this situation, in this Embodiment 7, when the μ estimated value is small, the ABS brake controller 89 reduces the threshold value at which the ABS brake mode is turned on to activate the ABS brake earlier so as to prevent a rise in slip ratio. When the brake is stepped on at this point, the μ estimated value obtained right before the brake is stepped on is used to prevent the system from malfunctioning.

On a low-μ road, even when the ABS mode is turned on earlier, if oil pressure is applied quickly, the slip ratio rises too high. Therefore, to prevent this danger, the ABS mode is turned on earlier on a low-μ road, and the oil pressure of the brake is slowly increased by the ABS brake controller 89. On the contrary, to reduce the oil pressure, as friction force is low on a low-μ road, the slip ratio does not rise quickly (the acceleration of the tire is slow). It is better to reduce the slip ratio as quickly as possible.

Figure 30:
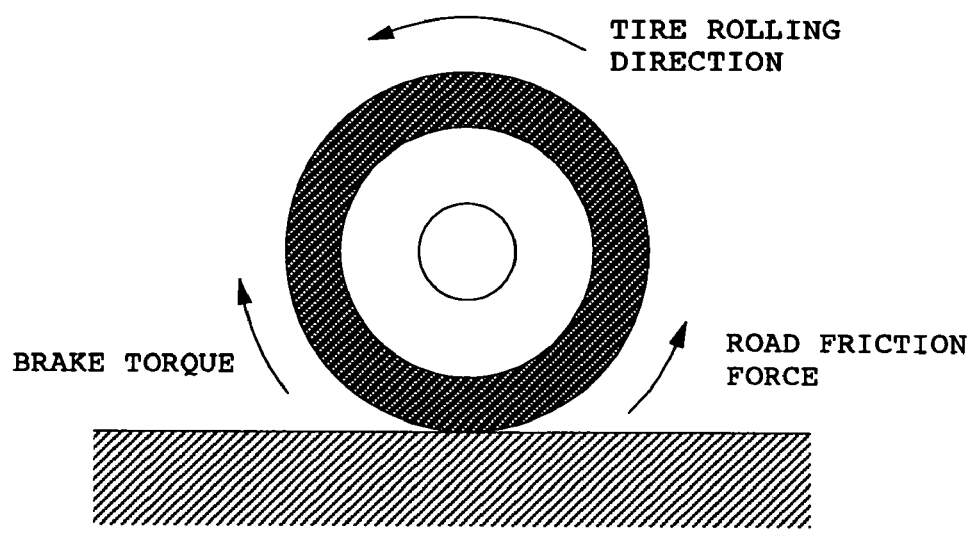
FIG. 30 is a diagram showing forces applied to a tire.
Figure 31:
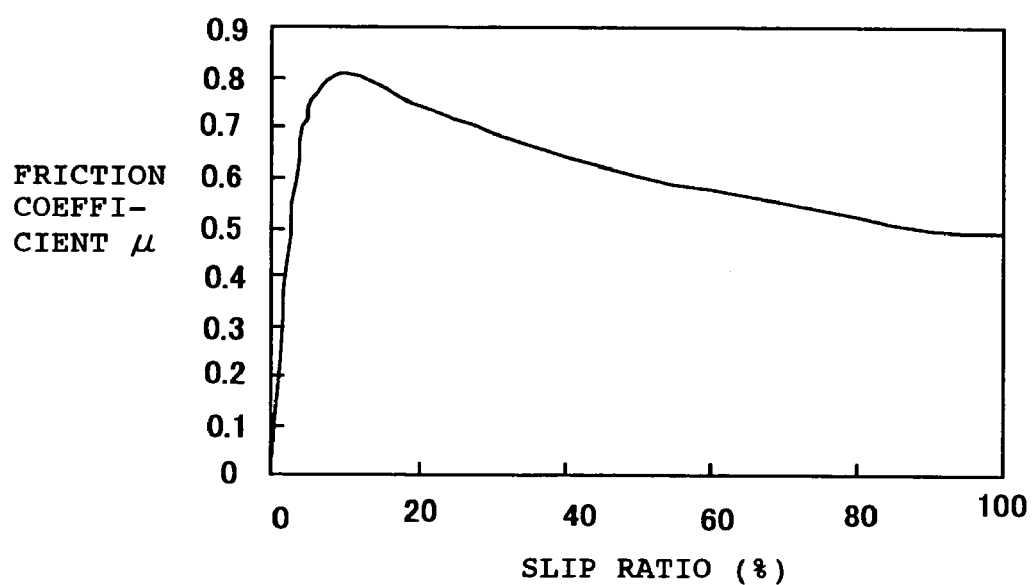
FIG. 31 is an S-μ curve showing the relationship between slip ratio and friction force.

FIG. 30 is a diagram showing forces applied to the tire. Friction force from the road is applied in the opposite direction to brake force as shown in FIG. 30. Therefore, when μ of the road is low, brake force becomes relatively high, the revolution of the tire sharply drops, and the slip ratio sharply rises. In an extreme case, the tire is locked. When the tire is locked, as shown in the S-μ curve showing the relationship between slip ratio and friction force of FIG. 31, μ lowers and steering force decreases, thereby making it impossible for the car to turn.

Thus, when the revolution of the tire drops, since friction force is low on a low-μ road, even when the oil pressure of the brake is reduced by ABS control, it takes time to return the slip ratio to an appropriate value. That is, the stopping distance becomes long.

Figure 32:
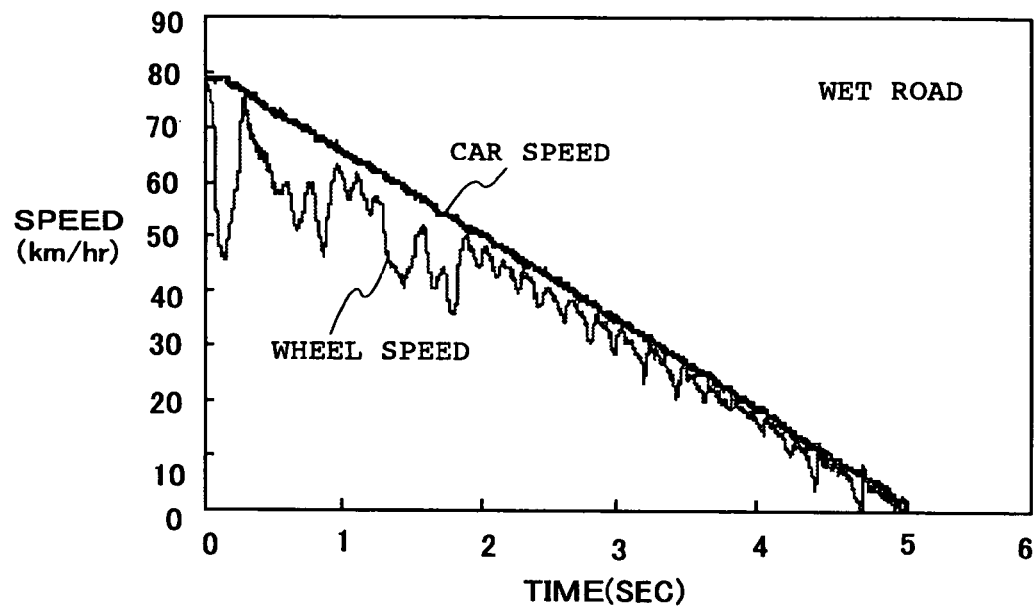
FIG. 32 is a graph showing the measurement results of car speed and wheel speed when a test car is caused to run over a wet road.
Figure 33:
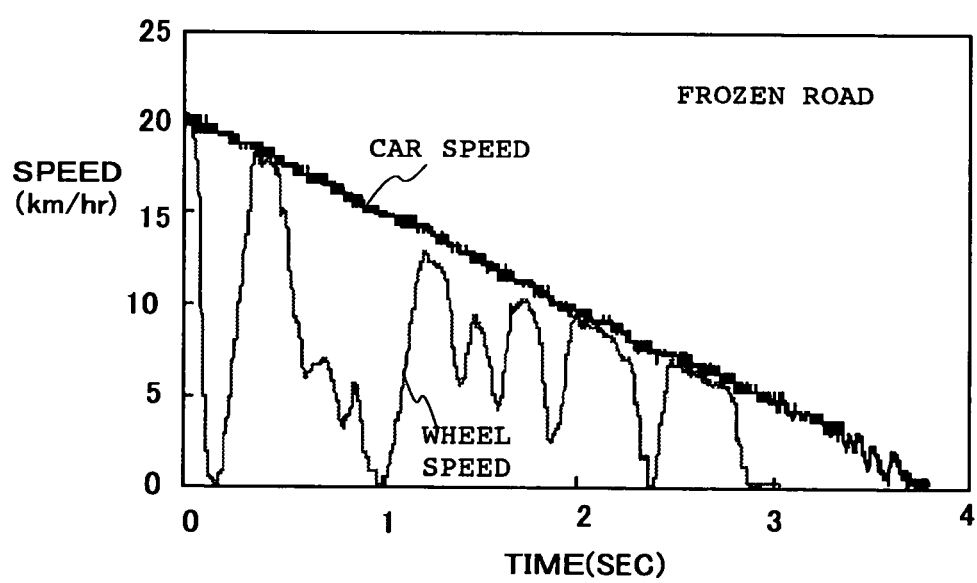
FIG. 33 is a graph showing the measurement results of car speed and wheel speed when a test car is caused to run over a frozen road.
Figure 34:
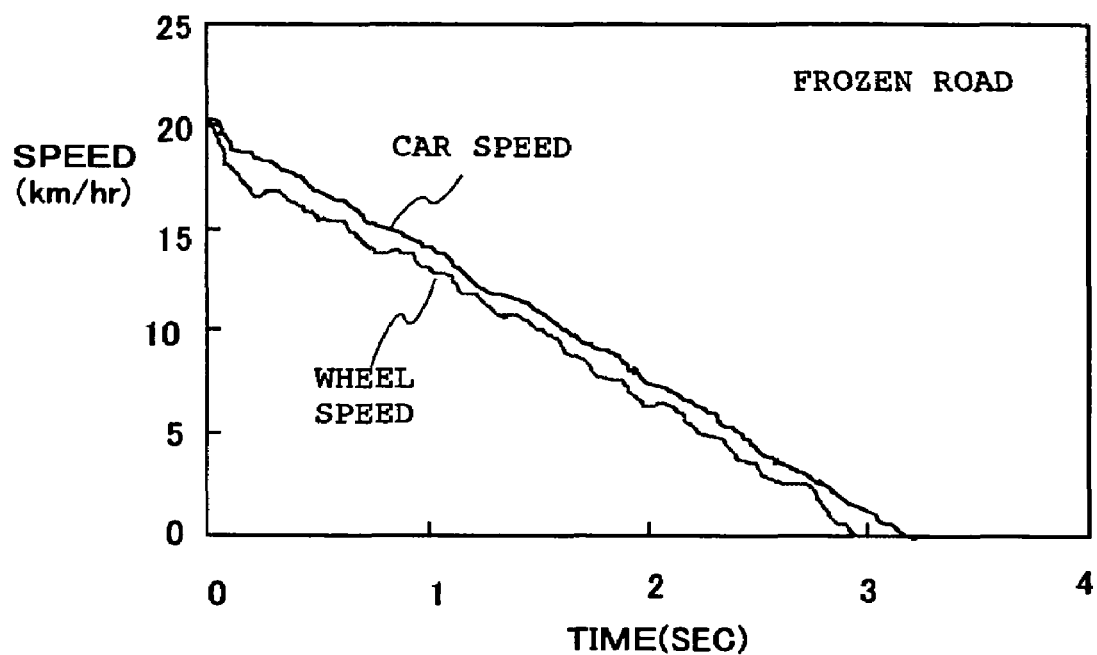
FIG. 34 is a graph showing the measurement results of car speed and wheel speed when a test car equipped with the ABS brake control apparatus of the present invention is caused to run over a frozen road.

FIG. 32 and FIG. 33 are graphs showing the relationship between car body speed and wheel speed obtained by causing the test car to run over a wet road and a frozen road. The slip ratio is obtained by dividing the speed difference between them by the car body speed.

It is seen that at the beginning of braking, the revolution of the tire tends to drop and the slip ratio is high on a frozen road as compared with a wet road. Therefore, on a low-μ road, it is preferred that the threshold value of oil pressure for shifting to ABS should be reduced to prevent an excessive rise in the oil pressure of the brake.

It is also preferred to control the increase and decrease of pressure during ABS braking properly according to μ of the road.

In the normal ABS control, the oil pressure of the ABS brake is controlled based on information from the gear sensor. However, the road μ is estimated in advance and the above oil pressure is controlled based on the μ estimated value to avoid a control mistake.

FIG. 33 is a graph showing the measurement results of car body speed and wheel speed obtained by carrying out an ABS brake test in which a test car equipped with the ABS brake control apparatus 80 of the present invention was caused to run over a frozen road. It is confirmed from comparison between FIG. 33 and FIG. 32 that when the car is braked with the ABS brake of the ABS brake control apparatus 80 of the present invention, the wheel speed does not drop as compared with the car body speed and the slip ratio is properly controlled.

INDUSTRIAL FEASIBILITY

As described above, according to the present invention, the vibration of the tire, wheel or suspension of a running car is detected by vibration detection means, and a vibration level at a frequency band included in the range of at least 10 to 10,000 Hz of the frequency spectrum of the above vibration obtained by analyzing the frequency of the vibration is detected to estimate the condition of the road at the time of running and the running state of the tire from the above detected vibration level. Therefore, the condition of the road and the running state of the tire can be estimated accurately, and the safety of the car can be greatly improved.

Since the vibration detection means is mounted on the same substrate or in the same housing as a pressure sensor for monitoring the pressure of a gas filled in the tire, the substrate can be shared by the vibration detection means and the pressure sensor, thereby making it possible to reduce the size and cost of the apparatus.

Further, signal processing means is provided on the tire or wheel side to convert a vibration information signal detected by the above vibration detection means into a digital signal and compress the signal to transmit it to the car body side so that the frequency of the compressed signal received on the car body side is analyzed. Therefore, continuous radio data communication becomes possible and the detection accuracy of the vibration can be improved.

When a slight change on the time axis of the pressure of a gas (generally air) filled in the tire is detected, and the vibration level or pressure change level of a frequency spectrum obtained by analyzing the frequency of the pressure change is detected to estimate the condition of the road at the time of running and the running state of the tire from the detected vibration level or pressure change level, the same effect as above can be obtained.

The pattern pitch frequency of the tire is detected from data on the above vibration spectrum or pressure change spectrum and data on the car speed, and when the vibration level or pressure change level at this pattern pitch frequency band exceeds a predetermined threshold value, it is estimated that the tire is hydroplaning. Thus, hydroplaning can be estimated without fail. A vibration level or pressure change level at a frequency band which is not affected by the above pattern pitch frequency is obtained, and when the ratio of the vibration level or pressure change level at the pattern pitch frequency band to the above obtained vibration level or pressure change level exceeds a predetermined threshold value, it is estimated that the tire is hydroplaning. Thus, the estimation accuracy can be further improved.

At least one of a tire vibration, wheel vibration, suspension vibration and a change in the inside pressure of the tire is detected, and the vibration level of a vibration spectrum obtained by analyzing the frequency of the vibration or the pressure change level of a pressure change spectrum obtained by analyzing the frequency of the pressure change is detected to estimate a road friction coefficient, the ON/OFF state of the brake switch is detected, and when it is judged that the brake is stepped on, the updating of the estimated value of road friction coefficient is suspended. Therefore, the estimation of a road friction coefficient is not carried out after the brake is stepped on, thereby making it possible to prevent the system from malfunctioning by a slip of the tire.

When the slip ratio is calculated by detecting the speeds of the driving wheel and the coupled driving wheel instead of detecting the above ON/OFF state of the brake switch and this detected slip ratio exceeds a predetermined threshold value, or when the engine speed is detected and this detected engine speed exceeds a predetermined threshold value, and the updating of the estimated value of road friction coefficient is suspended, the same effect can be obtained.

Since the road friction coefficient is continuously estimated and the threshold value of the oil pressure of the brake for shifting to ABS control is changed according to the estimated value of road friction coefficient right before the driver steps on the brake, the ABS brake is activated earlier and a rise in slip ratio can be suppressed.

Since the oil pressure of the ABS brake is controlled according to the estimated value of road friction coefficient right before the driver steps on the brake, a rise in slip ratio can be suppressed without fail.

What is claimed is:

1. A method of estimating the condition of a road and the running state of a tire, comprising:
   detecting a vibration of a tire, a wheel or a suspension of a running car; and
   detecting a vibration level of a vibration spectrum obtained by analyzing the frequency of the detected vibration to estimate the condition of the road at the time of running, and the running state of the tires,
   wherein the bandwidth of the frequency band for detecting the vibration level is 1 to 100% of that of a detection frequency band, and
   wherein the vibration level at a frequency band of at least 10 to 10,000 Hz of the vibration spectrum is detected.

2. The method of claim 1, wherein the vibration level is detected at three or more frequency bands.

3. The method of claim 1, wherein an estimated value of a road friction coefficient is calculated from the vibration level based on the following equation:

estimated value of road friction coefficient=$1/[1+\exp\{-(a_0+a_1x_1+a_2x_2+\ldots+a_nx_n)\}]$ wherein $a_0$ is a constant, $a_1, a_2, \ldots$ and $a_n$ are coefficients and $x_i$ is the vibration level at a frequency band ($f_i$).

4. The method of claim 3, wherein:
   a coefficient of correlation between the estimated value of the road friction coefficient a road friction coefficient measured in advance is obtained; and
   the frequency band ($f_i$) used to calculate the estimated value of the road friction coefficient is set to ensure that the coefficient of correlation becomes highest.

5. The method of claim 1, wherein the condition of the road at the time of running, and the running state of the tire, are estimated from data on car speed in addition to the detected vibration level of the vibration spectrum.

6. The method of claim 5, wherein:
   a pattern pitch frequency of the tire is detected from the data on car speed;
   a hydroplaning vibration level at a frequency band including the pattern pitch frequency of the vibration spectrum is detected; and
   when the detected hydroplaning vibration level exceeds a predetermined threshold value, it is estimated that the tire is hydroplaning.

7. The method of claim 6, wherein the threshold value can be changed.

8. The method of claim 5, wherein:
   a pattern pitch frequency of the tire is detected from data on car speed;
   a hydroplaning vibration level a frequency band including the pattern pitch frequency of the vibration spectrum is detected;
   a non-hydroplaning vibration level a frequency band which is not affected by the pattern pitch frequency is obtained; and
   when the ratio of the hydroplaning vibration level at the pattern pitch frequency band to the obtained non-hydroplaning vibration level exceeds a predetermined threshold value, it is estimated that the tire is hydroplaning.

9. The method of claim 8, wherein the threshold value can be changed.

10. The method of claim 1, wherein:
    a speed of the front wheels and a speed of the rear wheels are detected; and
    the condition of the road at the time of running, and the running state of the tire, are estimated from a slip ratio calculated from the detected speed of the front wheels and the detected speed of the rear wheels.

11. The method of claim 1, wherein the condition of the road at the time of running, and the running state of the tire, are estimated from data on the inside pressure of the tire in addition to data on the vibration spectrum.

12. The method of claim 11, wherein:
    a natural vibration frequency of the tire is obtained from data on the vibration spectrum;
    the inside pressure of the tire is estimated from the relationship between the vibration frequency of the tire and an inside pressure of the tire obtained in advance; and
    the estimated inside pressure of the tire is used as data on the inside pressure of the tire.

13. The method of claim 1, wherein the condition of the road at the time of running and the running state of the tire are estimated from data on a load applied to each wheel of a car in addition to data on the vibration spectrum or pressure change spectrum.

14. The method of claim 1, wherein:
    an information signal indicative of the vibration is converted into a digital signal and compressed on a tire or wheel side and transmitted to a car body side; and
    the compressed signal is restored to its original state and its frequency is analyzed on the car body side.

15. A method of estimating the condition of a road and the running state of a tire, comprising:
    detecting a change in the pressure of a gas filled in the tire of a running car; and
    detecting a pressure change level of a pressure change spectrum obtained by analyzing the frequency of the detected pressure change to estimate the condition of the road at the time of running, and the running state of the tire.

16. The method of estimating the condition of a road and the running state of a tire according to claim 15, wherein:
    an inside pressure of the tire is detected from an absolute value of an output of a pressure sensor installed in the tire; and a micro-vibration component on the time axis of the output is detected and taken as the change in the pressure of the gas.

17. The method of claim 15, wherein:
a pressure change level at a band synchronous with the revolution of the tire out of a frequency band of 10 to 100 kHz is detected from the pressure change spectrum and compared with a pressure change level at the time of normal operation; and
when the pressure change is 20% or more higher than that at the time of normal operation, it is estimated that some trouble occurs in the tire.

18. The method of claim 15, wherein the pressure change level is detected within a frequency range of at least 10 to 10,000 Hz of the pressure change spectrum.

19. The method of claim 18, wherein the pressure change level is detected within-three or more frequency bands of the frequency range.

20. The method of claim 15, wherein an estimated value of a road friction coefficient is calculated from the pressure change level based on the following equation:

estimated value of road friction coefficient=$1/[1+\exp\{-(a_0+a_1x_1+a_2x_2+\ldots+a_nx_n)\}]$ wherein $a_0$ is a constant, $a_1, a_2, \ldots$ and $a_n$ are coefficients and $x_i$ is the pressure change level at a frequency band ($f_i$).

21. The method of claim 20, wherein:
a coefficient of correlation between the estimated value of the road friction coefficient and another road friction coefficient measured in advance is obtained; and
the frequency band ($f_i$) used to calculate the estimated value of the road friction coefficient is set to ensure that the coefficient of correlation becomes highest.

22. The method of claim 15, wherein the condition of the road at the time of running, and the running state of the tire, are estimated from data on car speed in addition to the detected pressure change level of the pressure change spectrum.

23. The method of claim 22, wherein:
a pattern pitch frequency of the tire is detected from the data on car speed;
a hydroplaning pressure change level at a frequency band including the pattern pitch frequency of the pressure change spectrum is detected; and
when the detected hydroplaning pressure change level exceeds a predetermined threshold value, it is estimated that the tire is hydroplaning.

24. The method of claim 23, wherein the threshold value can be changed.

25. The method of claim 22, wherein:
a pattern pitch frequency of the tire is detected from the data on car speed;
a hydroplaning pressure change level at a frequency band including the pattern pitch frequency of the pressure change spectrum is detected;
a non-hydroplaning pressure change level at a frequency band which is not affected by the pattern pitch frequency is obtained; and
when the ratio of the hydroplaning pressure change level at the pattern pitch frequency band to the obtained non-hydroplaning pressure change level exceeds a predetermined threshold value, it is estimated that the tire is hydroplaning.

26. The method of claim 25, wherein the threshold value can be changed.

27. The method of claim 15, wherein:
a speed of the front wheels and a speed of the rear wheels are detected; and
the condition of the road at the time of running, and the running state of the tire, are estimated from a slip ratio calculated from the detected speed of the front wheels and the detected speed of the rear wheels.

28. The method of claim 15, wherein the condition of the road at the time of running, and the running state of the tire, are estimated from data on a load applied to each wheel of a car in addition to data on the pressure change spectrum.

29. The method of claim 15, wherein:
an information signal indicative of the pressure change is converted into a digital signal and compressed on a tire or wheel side and transmitted to a car body side; and
the compressed signal is restored to its original state and its frequency is analyzed on the car body side.

30. A road condition and tire running state estimation apparatus comprising:
vibration detection means for detecting a vibration of a tire or a wheel of a running car;
means for detecting a vibration level in a frequency band in a frequency range of at least 10 to 10,000 Hz of a frequency spectrum obtained by analyzing the frequency of the detected vibration; and
means for estimating a condition of a road at the time of running, and a running state of the tire, from the detected vibration level
wherein the vibration detection means is mounted on the same substrate, or in the same housing, as a pressure sensor for monitoring a pressure of a gas filled in the tire.

31. The apparatus according to claim 30, wherein the vibration detection means, or a substrate mounting the vibration detection means, is mounted to the tire or wheel.

32. The apparatus according to claim 30, wherein the vibration detection means is driven from a car body side by radio.

33. The apparatus according to claim 30, wherein:
a bandwidth of the frequency band is 1 to 100% of that of the frequency range; and
an estimated value of a road friction coefficient is calculated from the detected vibration level based on the following equation:

estimated value of road friction coefficient=$1/[1+\exp\{-(a_0+a_1x_1+a_2x_2+\ldots+a_nx_n)\}]$ wherein $a_0$ is a constant, $a_1, a_2, \ldots$ and $a_n$ are coefficients, and $x_i$ is the vibration level at the frequency band ($f_i$).

34. The apparatus according to claim 30, wherein:
a signal processing means is provided on a tire or wheel side; and
a vibration information signal detected by the vibration detection means is converted into a digital signal, compressed and transmitted to a car body side, where the compressed signal is received and restored to its original state, and its frequency is analyzed on the car body side.

35. The apparatus according to claim 34, wherein an antenna function for carrying out the communication of the data is provided to a tire valve installed in a wheel.

36. The apparatus according to claim 34, wherein an antenna for carrying out the communication of the data is installed at the periphery of a wheel rim.

37. The apparatus according to claim 30, wherein:
a signal processing means is provided on a tire or wheel side;

the condition of a road at the time of running, and the running state of a tire, are estimated by analyzing the frequency of a vibration information signal detected by the vibration detection means on the tire or wheel side; and the estimated data on the condition of the road at the time of running and the running state of the tire is transmitted to a car body side.

38. The apparatus according to claim 37, wherein an antenna function for carrying out the communication of the data is provided to a tire valve installed in a wheel.

39. The apparatus according to claim 37, wherein an antenna for carrying out the communication of the data is installed at the periphery of a wheel rim.

40. The apparatus according to claim 30, further comprising a reset button for initializing vibration information which differs according to the types of a car, wheel and tire, or a system for initializing the vibration information automatically by collating car behavior data information including one or more of wheel speed, car body acceleration and car body rotation angle speed with information from the estimation apparatus.

41. The apparatus according to claim 30, wherein each wheel of a car is provided with a load measuring instrument to estimate the condition of a road at the time of running, and the running state of a tire, from data on the load of each wheel.

42. The apparatus of claim 30 and car control means for controlling the running state of a car based on the condition of a road and/or the running state of a tire estimated by the apparatus.

43. A road condition and tire running state estimation apparatus comprising:
vibration detection means for detecting a vibration of the suspension of a running car;
means for detecting a vibration level in a frequency band in a frequency range of at least 10 to 10,000 Hz of a frequency spectrum obtained by analyzing the frequency of the detected vibration; and
means for estimating a condition of a road at the time of running, and a running state of the tire, from the detected vibration level.

44. The apparatus according to claim 43, wherein the vibration detection means is mounted on a hub to which a wheel carrying the tire is mounted.

45. The apparatus according to claim 43, wherein:
a bandwidth of the frequency band is 1 to 100% of that of the frequency range; and
an estimated value of a road friction coefficient is calculated from the detected pressure change level based on the following equation:

estimated value of road friction coefficient=$1/[1+\exp\{-(a_0+a_1x_1+a_2x_2+\ldots+a_nx_n)\}]$ wherein $a_0$ is a constant, $a_1$, $a_2$, ... and $a_n$ are coefficients, and $x_i$ is the vibration level at the frequency band ($f_i$).

46. The apparatus according to claim 43, wherein:
a signal processing means is provided on a tire or wheel side; and
a vibration information signal detected by the vibration detection means is converted into a digital signal, compressed and transmitted to a car body side, where the compressed signal is received and restored to its original state, and its frequency is analyzed on the car body side.

47. The apparatus according to claim 46, wherein an antenna function for carrying out the communication of the data is provided to a tire valve installed in a wheel.

48. The apparatus according to claim 46, wherein an antenna for carrying out the communication of the data is installed at the periphery of a wheel rim.

49. The apparatus according to claim 43, wherein:
a signal processing means is provided on a tire or wheel side;
the condition of a road at the time of running, and the running state of a tire, are estimated by analyzing the frequency of a vibration information signal detected by the vibration detection means on the tire or wheel side; and
the estimated data on the condition of the road at the time of running and the running state of the tire is transmitted to a car body side.

50. The apparatus according to claim 49, wherein an antenna function for carrying out the communication of the data is provided to a tire valve installed in a wheel.

51. The apparatus according to claim 49, wherein an antenna for carrying out the communication of the data is installed at the periphery of a wheel rim.

52. The apparatus according to claim 43, further comprising a reset button for initializing vibration information which differs according to the types of a car, wheel and tire, or a system for initializing the vibration information automatically by collating car behavior data information including one or more of wheel speed, car body acceleration and car body rotation angle speed with information from the estimation apparatus.

53. The apparatus according to claim 43, wherein each wheel of a car is provided with a load measuring instrument to estimate the condition of a road at the time of running, and the running state of a tire, from data on the load of each wheel.

54. The apparatus of claim 43 and car control means for controlling the running state of a car based on the condition of a road and/or the running state of a tire estimated by the apparatus.

55. A road condition and tire running state estimation apparatus comprising:
pressure change detection means for detecting a change in the pressure of a gas filled in a tire of a running car;
means for detecting a pressure change level in a frequency band in a frequency range of at least 10 to 10,000 Hz of a pressure change spectrum obtained by analyzing the frequency of the detected pressure change; and
means for estimating a condition of a road at the time of running, and a running state of the tire, from the detected pressure change level.

56. The apparatus according to claim 55, wherein the pressure of the gas filled in the tire is detected from an absolute value of the output of a pressure sensor installed in the tire and a micro-vibration component on the time axis of the output is detected and taken as a change in the pressure of the gas.

57. The apparatus according to claim 55, wherein:
a bandwidth of the frequency band is 1 to 100% of that of the frequency range; and
an estimated value of a road friction coefficient is calculated from the detected pressure change level based on the following equation:

estimated value of road friction coefficient=$1/[1+\exp\{-(a_0+a_1x_1+a_2x_2+\ldots+a_nx_n)\}]$ wherein $a_0$ is a constant, $a_1, a_2, \ldots$ and $a_n$ are coefficients, and $x_i$ is the pressure change level at the frequency band $(f_i)$.

58. The apparatus according to claim 55, wherein:
a signal processing means is provided on a tire or a wheel side; and
a pressure change information signal detected by the pressure change detection means is converted into a digital signal, compressed and transmitted to a car body side, where the compressed signal is received and restored to its original state, and its frequency is analyzed on the car body side.

59. The apparatus according to claim 58, wherein an antenna function for carrying out the communication of the data is provided to a tire valve installed in a wheel.

60. The apparatus according to claim 55, wherein:
a signal processing means is provided on a tire or wheel side; and
the condition of a road at the time of running, and the running state of a tire, are estimated by analyzing the frequency of a pressure change information signal detected by the pressure change detection means on the tire or wheel side; and
the estimated data on the condition of the road at the time of running, and the running state of the tire, is transmitted to a car body side.

61. The apparatus according to claim 58, wherein an antenna for carrying out the communication of the data is installed at the periphery of a wheel rim.

62. The apparatus according to claim 60, wherein an antenna function for carrying out the communication of the data is provided to a tire valve installed in a wheel.

63. The apparatus according to claim 60, wherein an antenna for carrying out the communication of the data is installed at the periphery of a wheel rim.

64. The apparatus according to claim 55, further comprising a reset button for initializing pressure change information which differs according to the types of a car, wheel and tire, or a system for initializing the pressure change information automatically by collating car behavior data information including one or more of wheel speed, car body acceleration and car body rotation angle speed with information from the estimation apparatus.

65. The apparatus according to claim 55, wherein each wheel of a car is provided with a load measuring instrument to estimate the condition of a road at the time of running and the running state of a tire from data on the load of each wheel.

66. The apparatus of claim 55 and car control means for controlling the running state of a car based on the condition of a road and/or the running state of a tire estimated by the apparatus.

67. A road condition estimation method for: estimating a value of a road friction coefficient by detecting at least one of a tire vibration, a wheel vibration, a suspension vibration and a change in the inside pressure of the tire; and detecting the vibration level of a vibration spectrum or the pressure change level of a pressure change spectrum obtained by analyzing the frequency of the vibration or the pressure change,
wherein, an ON/OFF state of a brake switch is detected, and when it is judged that the brake is stepped on, updating of the estimated value of road friction coefficient is suspended.

68. The method according to claim 67, wherein:
a bandwidth of a frequency band for detecting the vibration level or pressure change level is 1 to 100% of that of a characteristic frequency range; and
a road friction coefficient is estimated from data on the vibration level or pressure change level detected at one or a plurality of frequency bands based on the following equation:

estimated value of road friction coefficient=$1/[1+\exp\{-(a_0+a_1x_1+a_2x_2+\ldots+a_nx_n)\}]$ wherein $a_0$ is a constant, $a_1, a_2, \ldots$ and $a_n$ are coefficients and $x_i$ is a vibration level or pressure change level at a frequency band $(f_i)$.

69. A road condition estimation method for: estimating a value of a road friction coefficient by detecting at least one of a tire vibration, a wheel vibration, a suspension vibration and a change in the inside pressure of the tire; and detecting the vibration level of a vibration spectrum or the pressure change level of a pressure change spectrum obtained by analyzing the frequency of the vibration or the pressure change,
wherein, a slip ratio is calculated by detecting a speed of a driving wheel and a speed of a coupled driving wheel, and when the slip ratio exceeds a preset threshold value, updating of the estimated value of road friction coefficient is suspended.

70. The method according to claim 69, wherein:
a bandwidth of a frequency band for detecting the vibration level or pressure change level is 1 to 100% of that of a characteristic frequency range; and
a road friction coefficient is estimated from data on the vibration level or pressure change level detected at one or a plurality of frequency bands based on the following equation:

estimated value of road friction coefficient=$1/[1+\exp\{-(a_0+a_1x_1+a_2x_2+\ldots+a_nx_n)\}]$ wherein $a_0$ is a constant, $a_1, a_2, \ldots$ and $a_n$ are coefficients and $x_i$ is a vibration level or pressure change level at a frequency band $(f_i)$.

71. A road condition estimation method for: estimating a value of a road friction coefficient by detecting at least one of a tire vibration, a wheel vibration, a suspension vibration and a change in the inside pressure of the tire; and detecting the vibration level of a vibration spectrum or the pressure change level of a pressure change spectrum obtained by analyzing the frequency of the vibration or the pressure change,
wherein, an engine speed is detected, and when the engine speed exceeds a preset threshold value, updating of the estimated value of the road friction coefficient is suspended.

72. The road condition estimation method according to claim 71, wherein the threshold value of the engine speed is changed according to the connection state of a running gear and clutch.

73. The method according to claim 72, wherein:
a bandwidth of a frequency band for detecting the vibration level or pressure change level is 1 to 100% of that of a characteristic frequency range; and
a road friction coefficient is estimated from data on the vibration level or pressure change level detected at one or a plurality of frequency bands based on the following equation:

estimated value of road friction coefficient=$1/[1+\exp\{-(a_0+a_1x_1+a_2x_2+\ldots+a_nx_n)\}]$ wherein $a_0$ is a constant, $a_1, a_2, \ldots$ and $a_n$ are coefficients and $x_i$ is a vibration level or pressure change level at a frequency band ($f_i$).

74. The method according to claim 71, wherein:
a bandwidth of a frequency band for detecting the vibration level or pressure change level is 1 to 100% of that of a characteristic frequency range; and
a road friction coefficient is estimated from data on the vibration level or pressure change level detected at one or a plurality of frequency bands based on the following equation:

estimated value of road friction coefficient=$1/[1+\exp\{-(a_0+a_1x_1+a_2x_2+\ldots+a_nx_n)\}]$ wherein $a_0$ is a constant, $a_1, a_2, \ldots$ and $a_n$ are coefficients and $x_i$ is a vibration level or pressure change level at a frequency band ($f_i$).

75. A road condition estimation apparatus for: estimating a value of a road friction coefficient by detecting at least one of a tire vibration, a wheel vibration, a suspension vibration and a change in the inside pressure of the tire; and detecting the vibration level of a vibration spectrum or the pressure change level of a pressure change spectrum obtained by analyzing the frequency of the vibration or the pressure change,
wherein, the apparatus comprises means for detecting an ON/OFF state of a brake switch, and when it is judged that the brake is stepped on, updating of the estimated value of the road friction coefficient is suspended.

76. The apparatus according to claim 75, wherein:
an information signal indicative of the vibration or pressure change is converted into a digital signal and compressed on a tire, wheel or suspension side and transmitted to a car body side; and
the compressed signal is received and restored to its original state and its frequency is analyzed on the car body side.

77. A road condition estimation apparatus for: estimating a value of a road friction coefficient by detecting at least one of a tire vibration, a wheel vibration, a suspension vibration and a change in the inside pressure of the tire; and detecting the vibration level of a vibration spectrum or the pressure change level of a pressure change spectrum obtained by analyzing the frequency of the vibration or the pressure change,
wherein, the apparatus comprises means for detecting speeds of a driving wheel and a coupled driving wheel and means of calculating a slip ratio from the detected speeds of the driving wheel and the coupled driving wheel, and when the slip ratio exceeds a preset threshold value, updating of the estimated value of road friction coefficient is suspended.

78. The apparatus according to claim 77, wherein:
an information signal indicative of the vibration or pressure change is converted into a digital signal and compressed on a tire, wheel or suspension side and transmitted to a car body side; and
the compressed signal is received and restored to its original state and its frequency is analyzed on the car body side.

79. A road condition estimation apparatus for: estimating a value of a road friction coefficient by detecting at least one of a tire vibration, a wheel vibration, a suspension vibration and a change in the inside pressure of the tire; and detecting the vibration level of a vibration spectrum or the pressure change level of a pressure change spectrum obtained by analyzing the frequency of the vibration or the pressure change,
wherein, the apparatus comprises means for detecting an engine speed, and when the engine speed exceeds a preset threshold value, updating of the estimated value of the road friction coefficient is suspended.

80. The road condition estimation apparatus according to claim 79, wherein means for: detecting the connection state of a running gear and clutch is provided, and the threshold value of the engine speed is changed according to the connection state of the running gear and clutch.

81. The road condition estimation apparatus according to claim 80, wherein:
an information signal indicative of the vibration or pressure change is converted into a digital signal and compressed on a tire, wheel or suspension side and transmitted to a car body side; and
the compressed signal is received and restored to its original state and its frequency is analyzed on the car body side.

82. The apparatus according to claim 79, wherein:
an information signal indicative of the vibration or pressure change is converted into a digital signal and compressed on a tire, wheel or suspension side and transmitted to a car body side; and
the compressed signal is received and restored to its original state and its frequency is analyzed on the car body side.

83. An ABS brake control method comprising:
detecting at least one of a tire vibration, a wheel vibration, a suspension vibration and a change in the inside pressure of a tire;
detecting a vibration level of a vibration spectrum or a pressure change level of a pressure change spectrum obtained by analyzing the frequency of the vibration or the pressure change to estimate a road friction coefficient continuously; and
changing a threshold value of an oil pressure of a brake for shifting to ABS control according to the estimated value of road friction coefficient right before a driver steps on the brake.

84. The ABS brake control method according to claim 83, wherein:
a bandwidth of a frequency band for detecting the vibration level or pressure change level is 1 to 100% of that of a characteristic frequency range; and
the road friction coefficient is continuously estimated from data on the vibration level or pressure change level detected at one or a plurality of the frequency bands based on the following equation:

estimated value of road friction coefficient=$1/[1+\exp\{-(a_0+a_1x_1+a_2x_2+\ldots+a_nx_n)\}]$ wherein $a_0$ is a constant, $a_1, a_2, \ldots$ and $a_n$ are coefficients and $x_i$ is a vibration level or pressure change level at a frequency band ($f_i$).

85. An ABS brake control method comprising:
detecting at least one of a tire vibration, a wheel vibration, a suspension vibration and a change in the inside pressure of a tire;
detecting a vibration level of a vibration spectrum, or a pressure change level of a pressure change spectrum, obtained by analyzing the frequency of the vibration or the pressure change to estimate a road friction coefficient continuously; and adjusting a change in the oil pressure of an ABS brake according to the estimated value of road friction coefficient right before a driver steps on the brake.

86. The ABS brake control method according to claim 85, wherein:
- a bandwidth of a frequency band for detecting the vibration level or pressure change level is 1 to 100% of that of a characteristic frequency range; and
- the road friction coefficient is continuously estimated from data on the vibration level or pressure change level detected at one or a plurality of the frequency bands based on the following equation:

estimated value of road friction coefficient=$1/[1+\exp\{-(a_0+a_1x_1+a_2x_2+\ldots+a_nx_n)\}]$ wherein $a_0$ is a constant, $a_1, a_2, \ldots$ and $a_n$ are coefficients and $x_i$ is a vibration level or pressure change level at a frequency band ($f_i$).

87. An ABS brake control apparatus comprising:
- means for detecting at least one of a tire vibration, a wheel vibration, a suspension vibration and a change in the inside pressure of a tire;
- means for detecting a vibration level of a vibration spectrum or a pressure change level of a pressure change spectrum obtained by analyzing the frequency of an information signal indicative of the detected vibration or the detected pressure change to calculate the estimated value of a road friction coefficient continuously as=$1/[1+\exp\{-(a_0+a_1x_1+a_2x_2+\ldots+a_nx_n)\}]$, wherein $a_0$ is a constant, $a_1, a_2, \ldots$ and $a_n$ are coefficients and $x_i$ is a vibration level or pressure change level at a frequency band ($f_i$);
- means for detecting the ON/OFF state of a brake switch; and
- means for changing a threshold value of an oil pressure of a brake for shifting to ABS control according to the estimated value of the road friction coefficient right before a driver steps on the brake.

88. A car control apparatus comprising the ABS brake control apparatus of claim 87.

89. The method of claim 88, wherein the bandwidth of the frequency band is 1 to 100% of that of the frequency range.

90. An ABS control apparatus comprising:
- means for detecting at least one of a tire vibration, a wheel vibration, a suspension vibration and a change in the inside pressure of a tire;
- means for detecting a vibration level of a vibration spectrum or a pressure change level of a pressure change spectrum obtained by analyzing the frequency of an information signal indicative of the detected vibration or the detected pressure change to calculate the estimated value of a road friction coefficient continuously as=$1/[1+\exp\{-(a_0+a_1x_1+a_2x_2+\ldots+a_nx_n)\}]$, wherein $a_0$ is a constant, $a_1, a_2, \ldots$ and $a_n$ are coefficients and $x_i$ is a vibration level or pressure change level at a frequency band ($f_i$);
- means for detecting the ON/OFF state of a brake switch; and
- means for adjusting a change in the oil pressure of an ABS brake according to the estimated value of the road friction coefficient right before a driver steps on the brake.

91. A car control apparatus comprising the ABS brake control apparatus of claim 90.

* * * * *